(12) United States Patent
Vija et al.

(10) Patent No.: US 8,160,340 B2
(45) Date of Patent: Apr. 17, 2012

(54) RECONSTRUCTING A TOMOGRAPHIC IMAGE

(75) Inventors: Alexander Hans Vija, Evanston, IL (US); Amos Yahil, Stony Brook, NY (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 845 days.

(21) Appl. No.: 12/204,201

(22) Filed: Sep. 4, 2008

(65) Prior Publication Data

US 2010/0054564 A1  Mar. 4, 2010

(51) Int. Cl.
*G06K 9/36* (2006.01)
*G06K 9/40* (2006.01)

(52) U.S. Cl. ........ 382/131; 382/254; 382/260; 382/264; 382/265; 382/275; 378/4

(58) Field of Classification Search .................. 382/131, 382/132, 254, 260, 265, 275; 378/4
See application file for complete search history.

(56) References Cited

U.S. PATENT DOCUMENTS

| | | | |
|---|---|---|---|
| 5,155,365 A | 10/1992 | Cann et al. | |
| 5,602,891 A | 2/1997 | Pearlman | |
| 5,912,993 A * | 6/1999 | Puetter et al. | 382/275 |
| 6,353,688 B1 | 3/2002 | Puetter et al. | |
| 6,399,951 B1 | 6/2002 | Paulis et al. | |
| 6,490,374 B2 | 12/2002 | Puetter et al. | |
| 6,674,083 B2 | 1/2004 | Tanaka et al. | |
| 6,895,125 B2 | 5/2005 | Puetter et al. | |
| 6,956,925 B1 | 10/2005 | Hoffman | |
| 6,993,204 B1 * | 1/2006 | Yahil et al. | 382/265 |
| 7,180,074 B1 | 2/2007 | Crosetto | |
| 7,457,655 B2 | 11/2008 | Welch et al. | |
| 7,519,412 B2 | 4/2009 | Mistretta | |
| 7,863,574 B2 | 1/2011 | Hahn et al. | |
| 7,881,510 B2 | 2/2011 | Doyle | |
| 8,090,179 B2 * | 1/2012 | Vija et al. | 382/131 |
| 2002/0044698 A1 * | 4/2002 | Puetter et al. | 382/265 |
| 2003/0174900 A1 * | 9/2003 | Puetter et al. | 382/260 |
| 2003/0190065 A1 * | 10/2003 | Hamill et al. | 382/131 |
| 2006/0284095 A1 | 12/2006 | Muehllehner et al. | |
| 2008/0233546 A1 | 9/2008 | Baker et al. | |
| 2008/0270465 A1 | 10/2008 | Vija et al. | |
| 2009/0110321 A1 | 4/2009 | Vija et al. | |
| 2009/0112530 A1 | 4/2009 | Vija et al. | |
| 2009/0161933 A1 | 6/2009 | Chen et al. | |
| 2009/0175523 A1 | 7/2009 | Chen et al. | |
| 2009/0262996 A1 | 10/2009 | Samsonov et al. | |
| 2010/0102239 A1 * | 4/2010 | Hahn et al. | 250/363.05 |
| 2010/0308228 A1 | 12/2010 | Vija et al. | |

OTHER PUBLICATIONS

Shieh, et al., "Iterative image reconstruction using prior knowledge," J Opt Soc Am A Opt Image Sci Vis, vol. 23, No. 6, pp. 1292-1300, Jun. 2006.
Adluru, et al., "Temporally constrained reconstruction of dynamic cardiac perfusion MRI", Magn. Reson. Med., vol. 57, No. 6, pp. 1027-1036, (Jun. 2007).

(Continued)

*Primary Examiner* — Alexander H Taningco
(74) *Attorney, Agent, or Firm* — Peter Kendall

(57) ABSTRACT

Tomographically reconstructing a 3D image object corresponding to a data set includes for each step in a series of iteration steps, determining an updated object by performing a combined operation, which includes performing an update operation for updating an input object and performing a pixon smoothing operation, and following a last iteration, outputting one of the updated objects as the 3D image object.

23 Claims, 21 Drawing Sheets

OTHER PUBLICATIONS

Hudson, et al., "Accelerated image reconstruction using ordered subsets of projection data", IEEE Trans. Med. Imaging, vol. 13, No. 4, pp. 601-609 (1994).
Turkheimer, et al., "PET image denoising using a synergistic multiresolution analysis of structural (MRI/CT) and functional datasets", J. Nucl. Med., 49:657-66, 2008.
Somayajula, et al. "PET image reconstruction using anatomical information through mutual information based priors." pp. 2722-2726, 2010.
Sureau, et al. "Impact of Image-Space Resolution Modeling for Studies with the High-Resolution Research Tornograph," J Nucl Med, vol. 49, No. 6, pp. 1000-1008, Jun. 1, 2008.
Alenius, et al.., "Generalization of median root prior reconstruction," IEEE Trans. Med. Imaging, vol. 21, No. 11, pp. 1413-1420, Nov. 2002.
Hsu, C.., "A prior image model with mixed continuity constraints for Bayesian PET image reconstruction," Nuclear Science Symposium, 1999, Conference Record, 1999 IEEE, vol. 3, pp. 1428-1432, Seattle, Washington, Oct. 1999.
Gindi, G., et al., "Bayesian reconstruction of functional images using anatomical information as priors", IEEE Trans. Med. Imaging, vol. 12, No. 4, pp. 670-680, 1993.
Zhenyu, et al., "Approximate maximum likelihood hyper-parameter estimation for Gibbs priors." Image Processing, IEEE Transactions on, vol. 6, No. 6, pp. 844-861, 1997.
Reutter, et al., "Direct least-squares estimation of spatiotemporal distributions from dynamic SPECT projections using a spatial segmentation and temporal B-splines," Medical Imaging, IEEE Transactions on, vol. 19, No. 5, pp. 434-450, 2000.
Parra, et al., "List-mode likelihood: EM algorithm and image quality estimation demonstrated on 2-D PET," Medical Imaging, IEEE Transactions on, vol. 17, No. 2, pp. 228-235, 1998.
Nuyts, et al. "Simultaneous maximum a posteriori reconstruction of attenuation and activity distributions from emission sinograms," Medical Imaging, IEEE Transactions on 5 vol. 18, No. 5. pp. 393-403, 1999.
Hero, et al., "Information analysis of single photon emission computed tomography with count losses", Medical Imaging 9, IEEE Transactions, pp. 117-127 (1990).
Kadrmas, et al., "Maximum a posteriori algorithm for the reconstruction of dynamic SPECT data", IEEE Nuclear Science Symposium and Medical Imaging Conference, vol. 3, pp. 2086-2089, Nov. 8-14, 1998.
Kawata, et al., "Constrained Iterative Reconstruction by the Conjugate Gradient Method" IEEE Trans. Med. Imaging, vol. 4, No. 2, pp. 65-71, 1985.
LaRiviere, et al., "Nonparametric regression sonogram smoothing using a roughness-penalized Poisson likelihood objective function", IEEE Trans. Med. Imaging, vol. 19, No. 8, pp. 773-786, 2000.
Chiao, et al., "Model-based estimation for dynamic cardiac studies using ECT", IEEE Trans. Med. Imaging, vol. 13, No. 2, pp. 217-226, 1994.
Nichols, et al, "Spatiotemporal reconstruction of list-mode PET data," Medical Imaging, IEEE Transactions on, vol. 21, No. 4, pp. 396-404, 2002.
Kadrmas, et al., "4D maximum a posteriori reconstruction in dynamic SPECT using a compartmental model-based prior," Physics in Medicine and Biology, vol. 46, No. 5, pp. 1553-1574, 2001.
D. J. Kadrmas, "Statistically regulated and adaptive EM reconstruction for emission computed tomography," Nuclear Science, IEEE Transactions on, vol. 48, No. 3, pp. 790-798, 2001.
Shao, L., et al., "Information gain from count correction in SPECT image reconstruction and classification", IEEE Trans. Nucl. Science, vol. 37, No. 2, pp. 652-657, 1990.
Shieh, et al., "Image reconstruction: a unifying model for resolution enhancement and data extrapolation. Tutorial," J Opt Soc Am A Opt Image Sci Vis, vol. 23, No. 2, pp. 258-266, Feb. 2006.
Mighell, K.J., "Parameter estimation in astronomy with poisson-distributed data I. The statistic", Astrophys. J. 518, 380-393, 1998.
Wesolowski, C.A., et al., "Improved lesion detection from spatially adaptive, minimally complex Pixon® reconstruction of planar scintigraphic images", Comput. Med. Imaging Graph., 65-81, 2005.
Wernick, et al., "Emission tomography: the fundamentals of PET and SPECT", Chapters 7,11 and 21, Elsevier, Academic Press, 2004.
Galatsanos, et al., "Methods for Choosing the Regularization Parameter and Estimating the Noise Variance in Image Restoration and Their Relation", IEEE Transactions on Image Processing, vol. 1, No. 3, pp. 322-336 (Jul. 1992).
Fessler, et al., "Space-alternating generalized expectation-maximization algorithm", Signal Processing, IEEE T-SP 42(10): 2664-77, (Oct. 1994).
Vija, et al, "Preprocessing of SPECT Projection Data: Benefits and Pitfalls", 2005 IEEE Nuclear Science Symposium Conference Record, pp. 2160-2164.
Puetter, et al., "The pixon method of image reconstruction", Astronomical Data Analysis Software and Systems VIII, Astronomical Society of the Pacific, Conference Series 1999, 172, 307-316.
Lehovich, et al., "Human observer LROC study of lesion detection in Ga-67 SPECT images reconstructed using MAP with anatomical priors", 2006 IEEE nucl., Sci. Symp. Conf. Rec., 1699-702.
Lehovich, et al., "Choosing anatomical-prior strength for MAP SPECT reconstruction to maximize lesion detectability", 2007 IEEE Nucl. Sci. Symp. Conf. Rec., 4222-5.
K.J. Mighell, "Parameter estimation in astronomy with Poisson-distributed data. II. The modified chi-square gamma statistic", 2000, arXiv:astro-ph/0007328.
J. Hadamard, "Sur les problèmes aux dérivées partielles et leur signification physique", Princeton Uni. Bull., 13, 49-52, (1902).
Tsui, B.M.W., et al., "Quantitative cardiac SPECT reconstruction with reduced image degradation due to patient anatomy", IEEE Trans. Nuc. Sci., 41, 2838-44, 1994.
Gorman, J.D. and Hero, A.O., "Lower bounds for parametric estimation with constraints", IEEE Trans. Information Theory, vol. 36, No. 6, pp. 1285-1301, 1990.
Haacke, et al., "Constrained reconstruction: A super-resolution, optimal signal-to-noise alternative to the Fourier transform in magnetic resonance imaging", Medical Physics, vol. 16, No. 3, pp. 388-397, 1989.
Halder, et al., "Anatomically constrained reconstruction from noisy data", Magn. Reson. Med., vol. 59, No. 4, pp. 810-818, Apr. 2008.
Rangarajan, et al., "A model-based approach for filtering and edge detection in noisy images", IEEE Trans. Circuits and Systems, vol. 37, No. 1, pp. 140-144, 1990.
Roggemann, et al., "Model-based image reconstruction by means of a constrained least-squares solution", Appl Opt, vol. 36, No. 11, pp. 2360-2369, Apr. 10, 1997.
Roy, et al., "Three-dimensional unconstrained and constrained image-reconstruction techniques applied to fluorescence, frequency-domain photon migration", Appl. Opt., vol. 40, No. 13, pp. 2206-2215, May 1, 2001.
Tapiovaara, M.J. and Wagner, R.F., "SNR and noise measurements medical imaging: I. A practical approach based on statistical decision theory", Phys. Med. Biol., vol. 38, pp. 71-92, 1993.
Hadamard, J.,"Lectures on Cauchy's Problem in Linear Partial Differential Equations", New Haven: Yale Press. Reprinted 1952. New York: Dover Publications. (Webpage print out of coverpage, synopsis and table of contents from www.bn.com).
Green, P.J. and Silverman, B.W., "Generalized Linear Models: A Roughness Penalty Approach", Chapman & Hall/CRC, 1994 (Webpage print out of coverpage, synopsis and table of contents from www.bn.com.
Puetter, "The Pixon and Bayesian Image Reconstruction", SPIE vol. 2302, Image Reconstruction and Restoration (1994), pp. 112-131.
Puetter, "Pixons and Bayesian Image Reconstruction", SPIE vol. 1946, Infrared Detectors and Instrumentation (1993), pp. 405-416.
Pina, et al, "Bayesian Image Reconstruction: The Pixon and Optimal Image Modeling", Publications of the Astronomical Society of the Pacific, 105:630-637, Jun. 1993.
R.C. Puetter et al., "Digital Image Reconstruction: Deblurring and Denoising," Annu. Rev. Astro. Astrophys., 2005, 43: 139-194.

R.C. Puetter et al., "The pixon method of image reconstruction," Astronomical Data Analysis Software and Systems VIII., edited by D. M. Mehringer, R. L,. Plante D. A. Roberts, Astronomical Society of the Pacific, San Francisco, ASP Conference Series 1999, 172, 307-316.

C.A. Wesolowski et al., "Improved lesion detection from spatially adaptive, minimally complex, pixon reconstruction of planar scintigraphic images", Comput. Med. Imaging Graph., 2005, 29, 65-81.

H. M. Hudson and R. S. Larkin, "Accelerated image reconstruction using ordered subsets of projection data," IEEE Transactions on Medical Imaging, vol. 13, No. 4, pp. 601-609, 1994.

* cited by examiner

RECONSTRUCTING A TOMOGRAPHIC IMAGE

CROSS REFERENCE TO RELATED APPLICATION

Under 35 USC 120, this application claims priority from U.S. patent application Ser. No. 11/931,195, filed on Oct. 31, 2007, the contents of which are hereby incorporated by reference in their entirety.

TECHNICAL FIELD

This invention relates to image reconstruction, and in particular, to image reconstruction using a pixon smoothing operation.

BACKGROUND

An overview of different reconstruction methods including a pixon method is given in R. C. Puetter et al., "Digital Image Reconstruction: Deblurring and Denoising," Annu. Rev. Astro. Astrophys., 2005, 43: 139-194; the pixon method is described in R. C. Puetter et al., "The pixon method of image reconstruction," Astronomical Data Analysis Sottware and Systems VIII., edited by D. M. Mehringer, R. L, Plante D. A. Roberts, Astronomical Society of the Pacific, San Francisco, ASP Conference Series 1999, 172, 307-316, the contents of which are herein incorporated by reference. An application of the pixon method to medical planar imaging is discussed in C. A. Wesolowski et al., "Improved lesion detection from spatially adaptive, minimally complex, Pixon® reconstruction of planar scintigraphic images", Comput. Med. Imaging Graph., 2005, 29, 65-81, the contents of which are herein incorporated by reference.

SUMMARY

The invention is based in part on the recognition that pixon smoothing can be integrated into iterative image reconstruction, for example, by pixon smoothing an estimated image object or a parameter object used within the iterative image reconstruction.

In an aspect, tomographically reconstructing a 3D image object corresponding to a data set includes providing a pixon map, and for each step in a series of iteration steps, determining an updated object by performing a combined operation, which includes performing an update operation for updating an input object and performing a pixon smoothing operation, and following a last iteration, outputting one of the updated objects as the 3D image object.

In another aspect, a nuclear imaging device for providing a 3D image object includes a detector unit for detecting radiation emitted from within a detecting area and providing a data set indicative of the detected radiation, an iterative reconstruction unit configured to perform, in each iteration step, a combined operation that includes an update operation for updating an input object and a pixon smoothing operation, and an output port for providing the 3D medical image.

Implementations may include one or more of the following features. Performing the smoothing operation of the combined operation may create a pixon smoothed object, which then is updated by the update operation. Performing the update operation of the combined operation may create an unsmoothed updated object, which then is pixon smoothed by the pixon smoothing operation.

The combined operation may further include performing a first projection operation from a data space to an object space, thereby creating a projected object, and wherein the pixon smoothing operation smoothes the projected object.

The pixon smoothing operation may create a pixon smoothed object and the combined operation may further include, following performance of the pixon smoothing operation, performing a projection operation of the pixon smoothed object from the object space to the data space.

The update operation may include performing the pixon smoothing operation.

Performing the update operation may include performing a calculation based on a parameter object, and the pixon smoothing operation is integrated into the update operation to pixon smooth the parameter object.

The update operation may include pixon smoothing a parameter object of a non-negative least square fit algorithm.

Reconstructing a 3D image object may further include determining a pixon map associated to pixon smoothing.

Reconstructing a 3D image object may further include determining a pixon map based on the data set and an initial object.

Each iteration step may further include updating the pixon map based on the data set and the updated object of the preceding update operation. Each iteration step may include the steps of evaluating whether the update of the pixon map is necessary; and updating the pixon map based on the result of the evaluation, the data set, and an updated object. Each iteration step may further include updating a parameter of the update operation.

Each iteration step may further include executing a loop over subsets of the data set, wherein the loop includes performing the update operation. Executing the loop may further include performing the pixon smoothing operation and/or updating the pixon map and/or updating a parameter of the update operation. Executing the loop may further include evaluating whether an update of the pixon map is necessary and updating the pixon map based on the result of the evaluation, the data set and an updated object of the image object.

The update operation may be an update operation of a reconstruction algorithm selected from the group consisting of algorithms based on an ordered subset expectation maximization, algorithms based on a non-negative least square fit, and algorithms based on an ordered subset non-negative least square fit.

The reconstruction unit of the nuclear imaging device may be configured to update the pixon map used within the pixon operation based on an updated image object.

The detector unit of the nuclear imaging device may include a detector system of a positron emission tomography detector system, a single photon computed tomography detector system and/or a computed tomography detector system.

These general and specific aspects may be implemented using a system, a method, a computer readable medium, or a computer program, or any combination of systems, methods, a computer readable medium, or a computer programs.

Certain implementations may have one or more of the following advantages. The pixon smoothed tomographic image has a high quality. Combining pixon smoothing with the update operation of the tomographic reconstruction can be used to further smooth an object based on the statistics of the data set.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
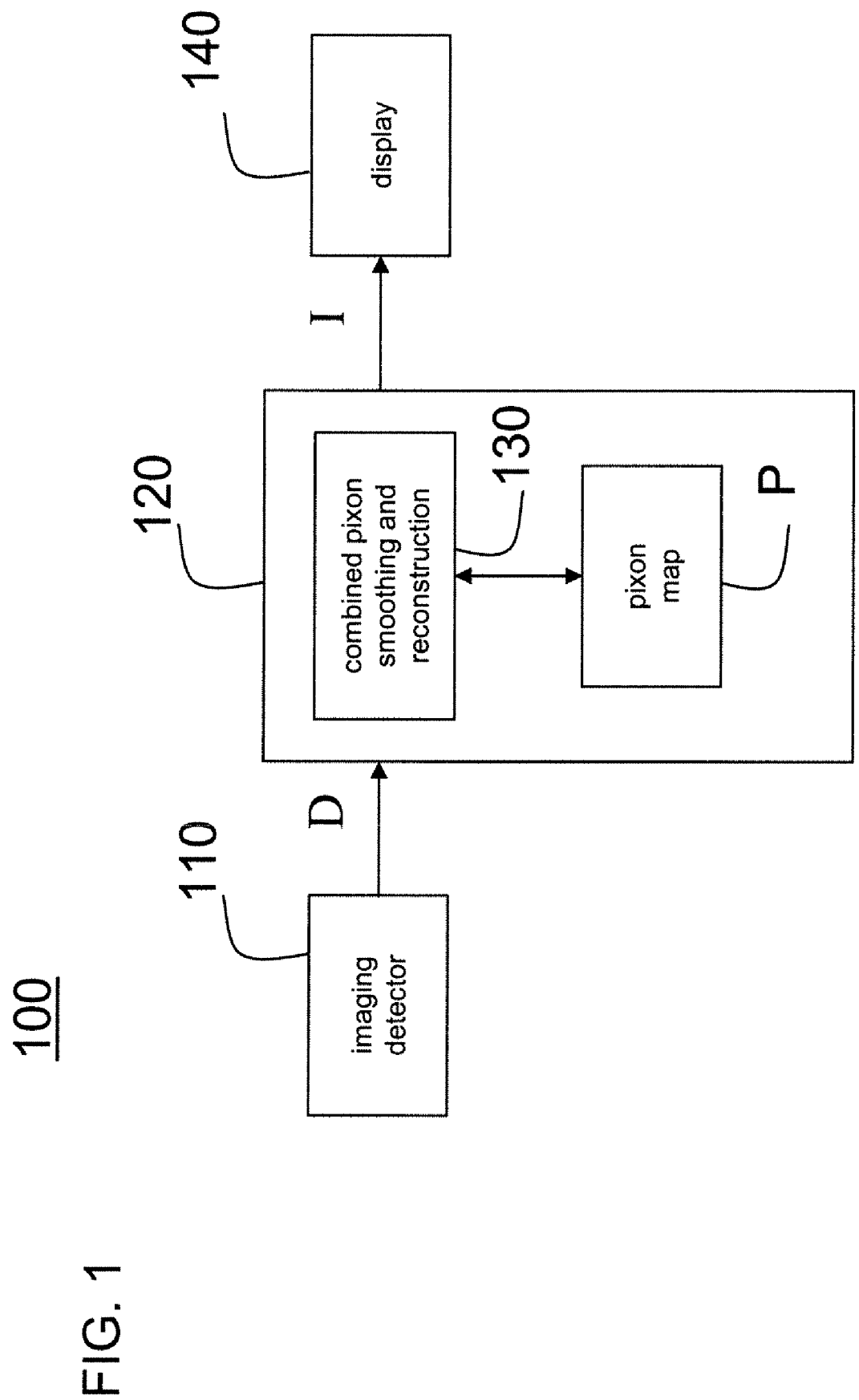
FIG. 1 is an overview of a nuclear imaging system.

FIG. 1 shows a nuclear imaging system 100 with an imaging detector 110, and a pixon reconstruction unit 120 using a combined pixon smoothing and reconstruction operation 130 that interacts with a pixon map P. The combined pixon smoothing and reconstruction operation 130 is based on a pixon method. The pixon method refers to a method that smoothes an object at each point in object space (hereafter an "object point") by considering an assigned volume for the smoothing that is determined by a statistical evaluation for each object point.

The pixon smoothing method described herein is one example of a smoothing operation that constrains the reconstruction. However, operations other than pixon smoothing can also be used. For example, one could additionally smooth by constraining operations that are based on Fourier filtering, application of a Wiener filter, wavelet filtering and/or application of a fixed filter. For such constraining operations, the associated filter functions can be stored in a constraining map corresponding to the pixon map P. An overview of different smoothing methods is given in R. C. Puetter et al., "Digital Image Reconstruction: Deblurring and Denoising," Annu. Rev. Astro. Astrophys., 2005, 43: 139-194.

The object space is the space in which the result of the image reconstruction is defined and which corresponds to the 3D volume that was imaged using the nuclear imaging system 100. A data space is given by the data points measured with the imaging detector 110.

Within this application "pixon" is used to indicate that a term, method, object etc. refers to the pixon method, and the use of variable volumes when smoothing a 3D image object. For example, the assigned volumes are defined by pixon kernel functions, and the pixon map P stores the information about which of the pixon kernel functions is assigned to which of the object points.

The pixon method provides a smoothed 3D image object I in object space that is a reconstruction of a data set D measured in data space and that fulfills statistical conditions associated with the data set D. The reconstruction in three-dimensions (3D) in the pixon reconstruction unit 120 is based on a combined pixon smoothing and reconstruction algorithm, during which pixon smoothing operations are applied to objects in object space. Each of the pixon smoothing operations, which will be described in more detail in connection with FIGS. 5 to 8, uses the pixon map P.

The pixon smoothing operation is spatially adaptive, as the pixon smoothing operation depends on the values of the measured data set that correspond to that object point. To every object point, one assigns a pixon kernel function, which is the basis for the pixon smoothing operation. Within the pixon reconstruction unit 120, the pixon map P defines which of the pixon kernel functions is assigned to each of the object points.

The pixon method is especially suited for reconstructing an object from a measured data set with a low number of counts and an unavoidable noise contribution. Such data sets are produced, for example, with medical imaging techniques in nuclear medicine, which produce 3D images of, for example, a functional process in a patient's body by using nuclear properties of matter. Examples of such imaging techniques are Positron Emission Tomography (PET) and Single Photon Emission Computed Tomography (SPECT). For these types of nuclear imaging, one administers a radioactive substance to the patient and detects emitted radiation with a detector system, e.g., with a ring detector for PET or with one or several gamma cameras for SPECT.

Referring to FIG. 1, the imaging detector 110 of the nuclear imaging system 100 detects the γ-radiation emitted from the patient. Therefore, it is positioned around or partly around the patient and could be a conventional SPECT or PET detector system. The imaging detector 110 provides the data set D to the pixon reconstruction unit 120, which uses, for example, a system matrix H to describe the properties of the nuclear imaging system 100, and an iteratively improved data model to calculate the 3D image object I on the basis of the data set D and the pixon map P. For example, the 3D image object I can then be displayed on a display 140 using well-known volume rendering techniques.

Pixon Map Determination

The pixon method includes a search for the broadest possible pixon kernel functions that define the largest shape for the smoothing operation at each object point and that together provide an adequate fit of an object, e.g. the 3D image object I, to the data set D. The pixon kernel functions are determined on the basis of a minimum complexity approach and are used within the pixon smoothing operation. An exemplary determination of a pixon map P for the case of low count data having a Poisson-like statistic is described in the co-pending U.S. Published Pat. Application No. 2009/0110321, entitled "Determining a pixon map for image reconstruction," by A. Yahil and H. Vija, of even date herewith, the contents of which are herein incorporated by reference. The information about the selected pixon kernel functions is stored in the pixon map P, which assigns to each object point its pixon kernel function.

Combined Smoothing and Reconstruction Algorithm

Iterative image reconstruction methods, such as non-negative least square or Poisson-likelihood algorithms, iteratively fit image models to a measured data set and thus minimize the effect of noise on the image. The result of a reconstruction algorithm is an approximated image that is fit to the measured data set D according to the rules of the algorithm. Within the pixon reconstruction unit 120, such an iterative image reconstruction algorithm is modified by using one or more pixon smoothing operations within the iteration. The smoothing operations act on an object that is created within an iteration step. For example, during an iteration, one can generate an object that is a preliminary approximation of the final image object. In some systems, this object serves as an input object for a next iteration step. However, in the combined pixon smoothing and reconstruction operation 130, the object is first smoothed based on the pixon map P during each iteration, before it is provided as an input object to the next iteration.

The pixon reconstruction unit 120 is configured for image reconstruction that uses an image reconstruction algorithm, in which a pixon smoothing operation is integrated. The image reconstruction algorithm fits a data model, corresponding to the 3D image object, to the measured data set D.

Figure 2:
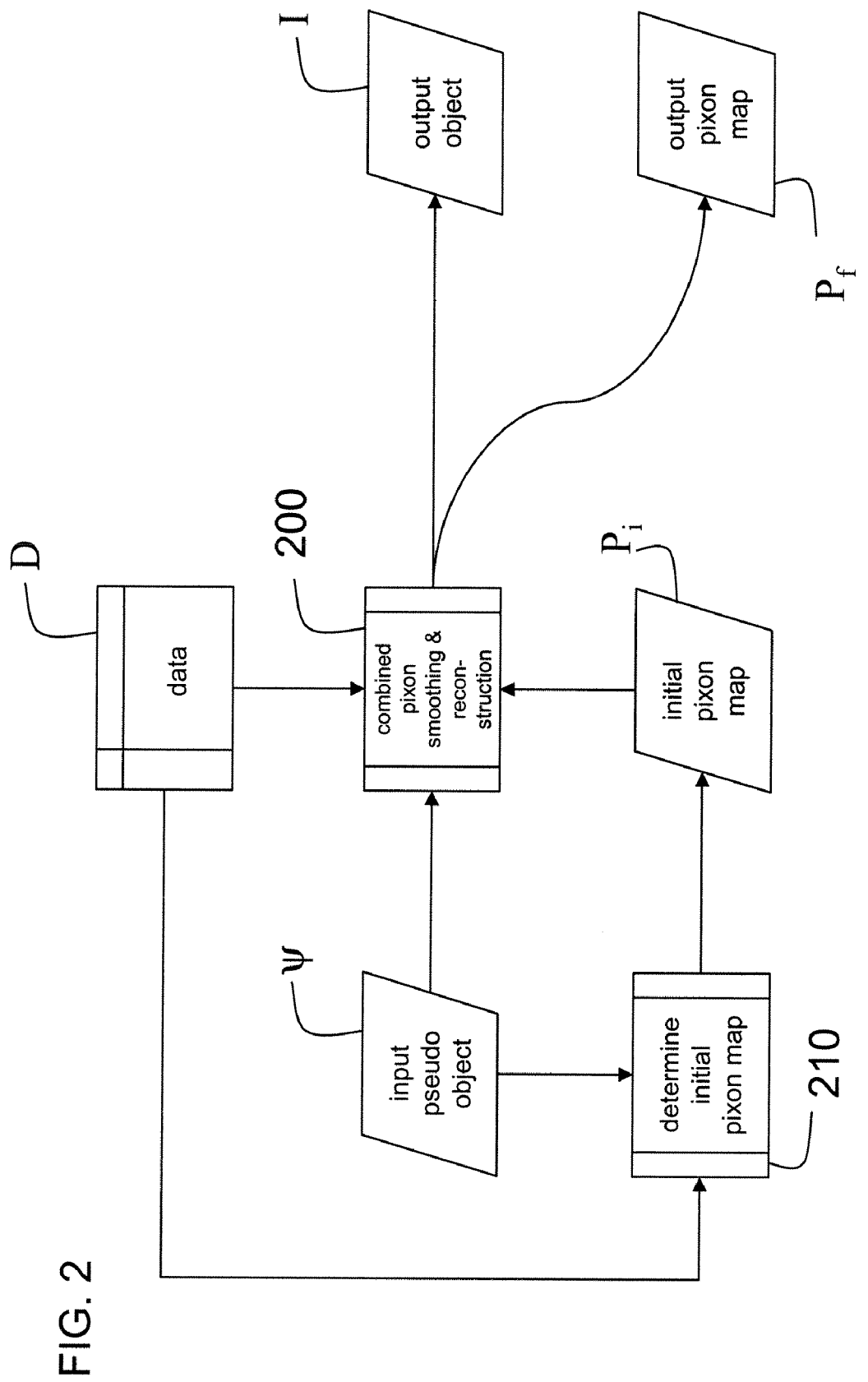
FIG. 2 is a flowchart illustrating an exemplary implementation of a combined pixon smoothing and reconstruction algorithm.

FIG. 2 shows an overview flowchart of an exemplary implementation of a combined smoothing and reconstruction algorithm (step 200) that estimates the final 3D image object I based on a 3D input object. Examples of a reconstruction algorithm that can be combined with smoothing include algorithms based on maximum likelihood, based on a penalty function, algorithms based on an ordered subset expectation maximization, algorithms based on a non-negative least square fit, and algorithms based on an ordered subset non-negative least square fit. Details of an algorithm based on a non-negative least square fit are disclosed in the co-pending U.S. Published Pat. Application No. 20080270465, entitled "NNLS image reconstruction," by A. Yahil and H. Vija, filed on even date herewith, the contents of which are herein incorporated by reference. In addition the merit function of a reconstruction algorithm can include a penalty function. Examples of a penalty function include a linear (Tikhonov) penalty function, a total variation penalty function, or a penalty function based on maximum entropy or Markov random fields (Gibbs priors).

The 3D input object ψ is used to determine an initial pixon map $P_i$ (step 210), which is used for the first pixon smoothing operation within the combined pixon map and reconstruction algorithm. The initial pixon map $P_i$ can be determined with a separate pixon map construction algorithm. In addition, or alternatively the pixon map $P_i$ can be updated (or created) within the combined pixon map and reconstruction algorithm (step 200). An output of the combined pixon map and reconstruction algorithm (step 200) is the final 3D image object I. A final pixon map $P_f$, which indicates the pixon kernel functions used for the last pixon smoothing operation, can also be provided as an output.

Figure 3:
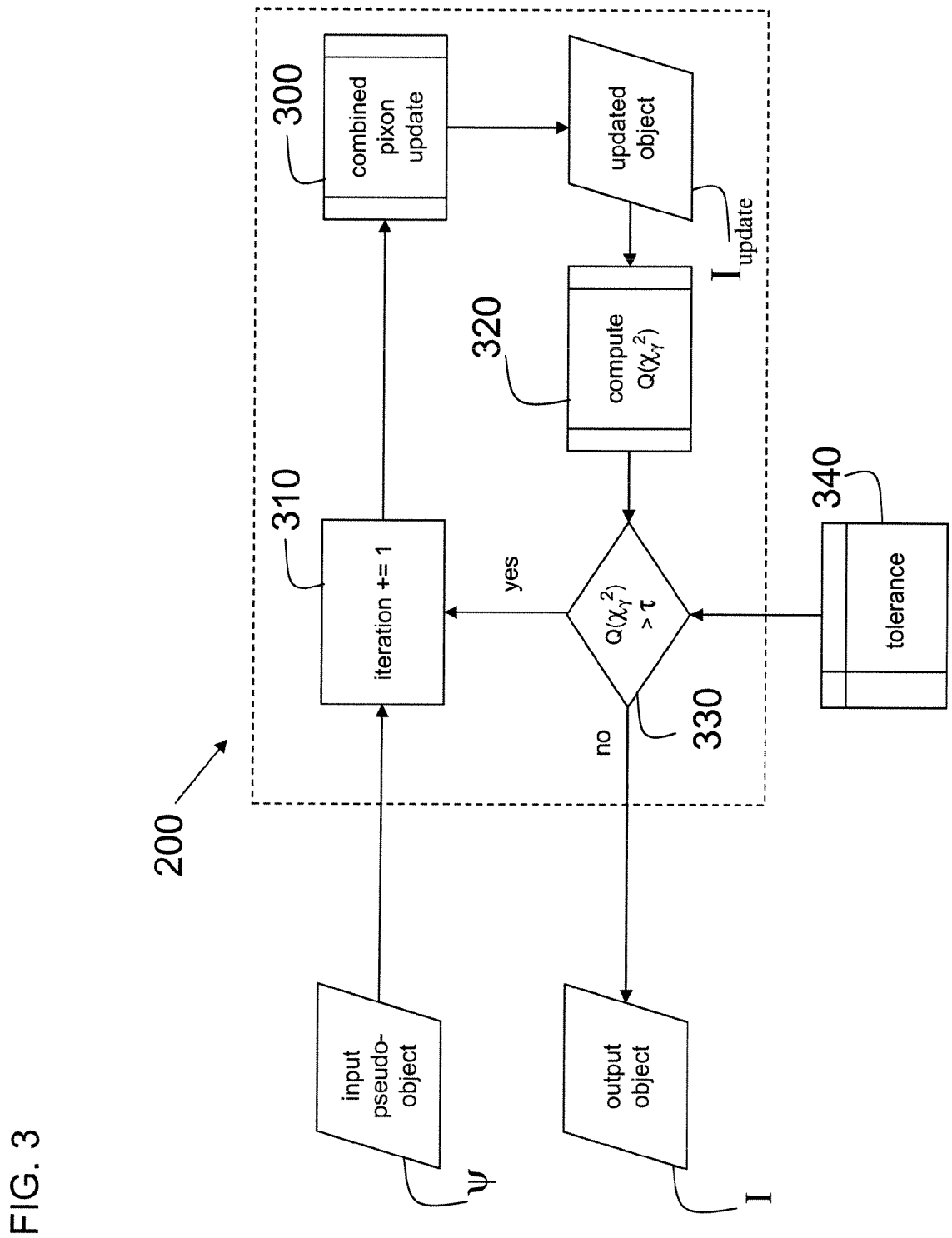
FIG. 3 is a flowchart illustrating an exemplary iterative combined pixon smoothing and reconstruction algorithm.

FIG. 3 shows the details associated with the combined pixon map and reconstruction algorithm (step 200). The pseudo-object ψ is smoothed using a combined pixon smoothing and reconstruction update (step 300), which generates an updated object $I_{update}$. An iterative cycle is indicated by increasing an increment, iteration (step 310). The number of iterations can be preset or manually assigned. Alternatively, as shown in FIG. 3, the number of iterations can be adaptively chosen by calculating a stop-criterion, $Q(\chi_\gamma^2)$, (step 320) after completing an iteration step, and determining whether a data model, corresponding to the updated object $I_{update}$, fulfills a preset condition (step 330).

One such condition is a comparison of the stop-criterion, $Q(\chi_\gamma^2)$, with a threshold, τ, which is stored in a the tolerance table 340. Thus, in such a goodness-of-fit evaluation of the updated object $I_{update}$, the quality of the approximated image object can be used to end the iteration. Examples for a quality-controlled iterative reconstruction are given in co-pending U.S. Published Pat. Application No. 20090112530, entitled "Controlling the number of iterations in image reconstruction," by A. Yahil and H. Vija of even date herewith, the contents of which are herein incorporated by reference.

Figure 4:
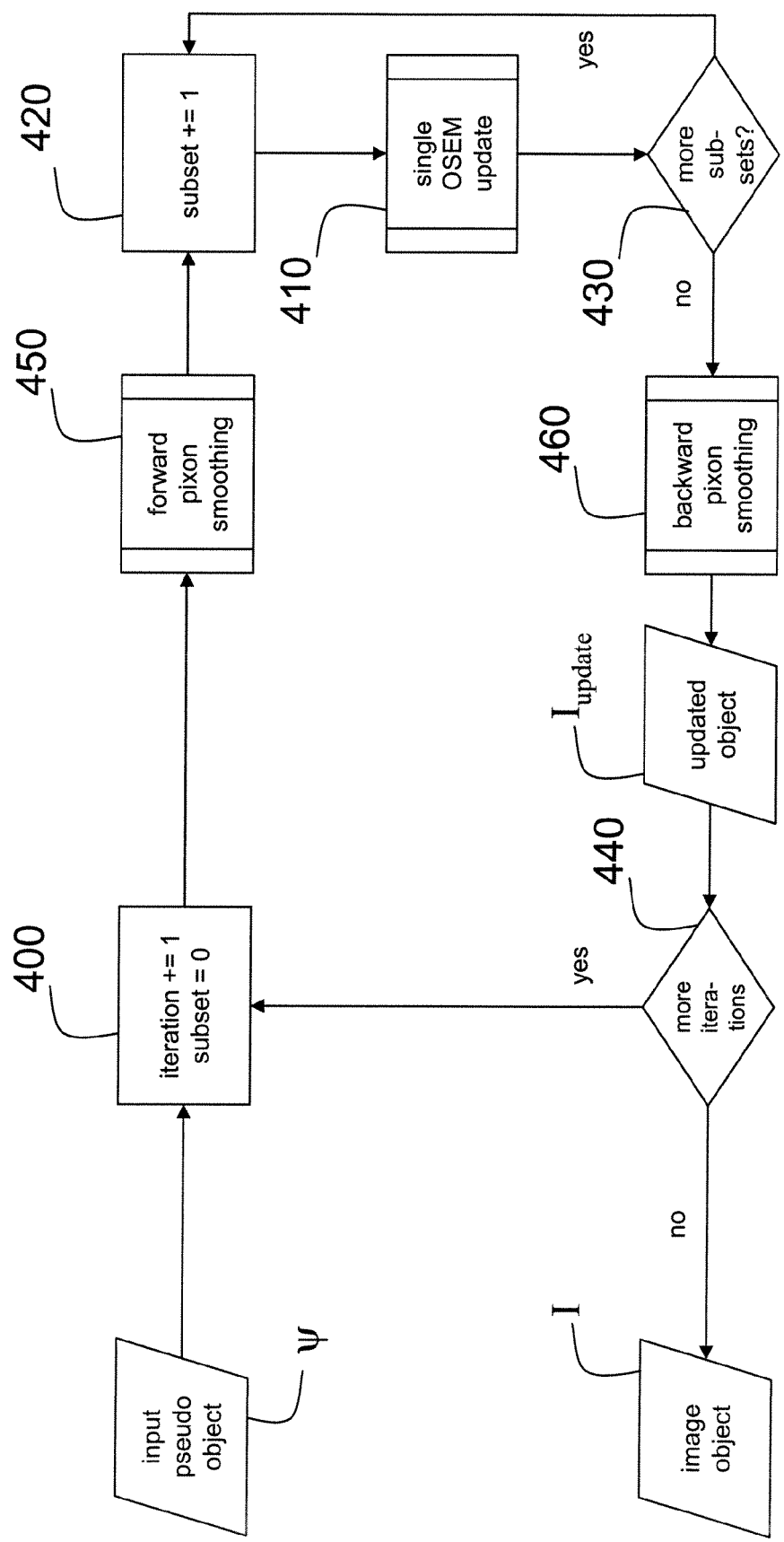
FIG. 4 is a flowchart illustrating a first example of a combined pixon smoothing and reconstruction algorithm based on an OSEM update with a forward and a backward pixon smoothing operation within an iteration.

FIG. 4 shows a first example of how two smoothing operations (specifically, a forward pixon smoothing operation (step 450) and a backward pixon smoothing operation (step 460)) are integrated into the iterative cycle of an ordered subset expectation maximization algorithm (OSEM algorithm). The OSEM algorithm is described, for example, in H. M. Hudson and R. S. Larkin, "Accelerated image reconstruction using ordered subsets of projection data," IEEE Transactions on Medical Imaging, vol. 13, no. 4, pp. 601-609, 1994, the contents of which are herein incorporated by reference. Within the OSEM algorithm, an iteration step is defined as a single pass through all the subsets, in which for each subset, the current estimate is used to initialize application of the expectation maximization with the data subset.

Usually, the iteration will start in object space. During the iteration process (indicated by the increase of an iteration counter, iteration (step 400)), an updated object $I_{update}$ is used as an input object for the next iteration step. Thus, each iteration step begins with an improved estimate of the object.

As iteration progresses, the updated object $I_{update}$ converges to, for example, a distribution of a radioactive substance administered to the patient.

Within each iteration step, a single OSEM update (step 410) is calculated for a series of subsets of the data set D as indicated by incrementing a subset (step 420). In data space, the single OSEM update (step 410) compares a data model, corresponding to the updated object $I_{update}$, with the data set D. The OSEM update (step 410) is followed by a test to determine whether all subsets were considered (step 430). After completing an iteration step, i.e., after considering all subsets, a second test determines whether another iteration is necessary (step 440). If no further iterations are necessary, the iteration is stopped and the currently calculated object $I_{update}$ is assigned as the output of the reconstruction, i.e. as the 3D image object I.

Figure 5:
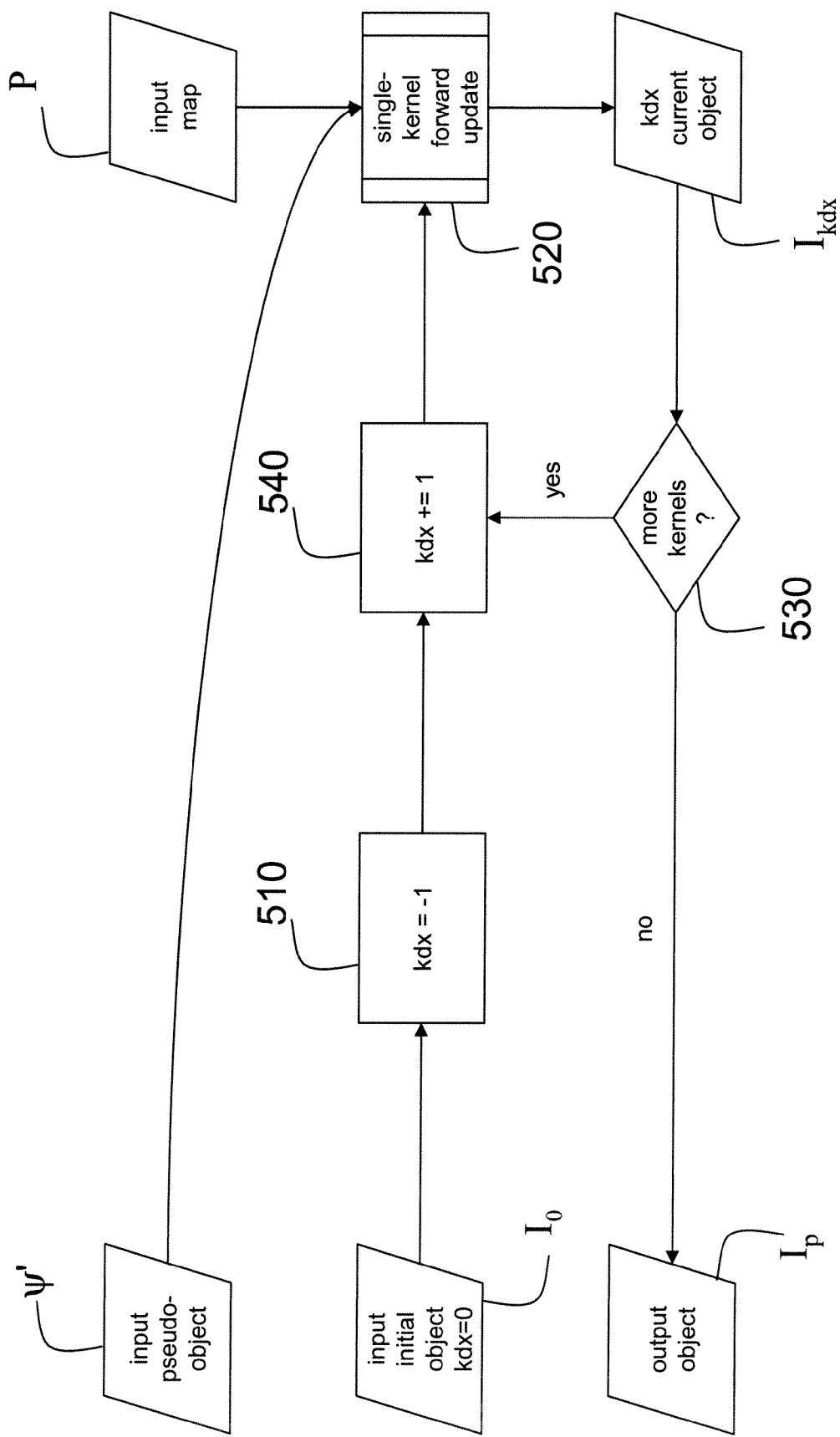
FIG. 5 is an example of a forward pixon smoothing operation.
Figure 6:
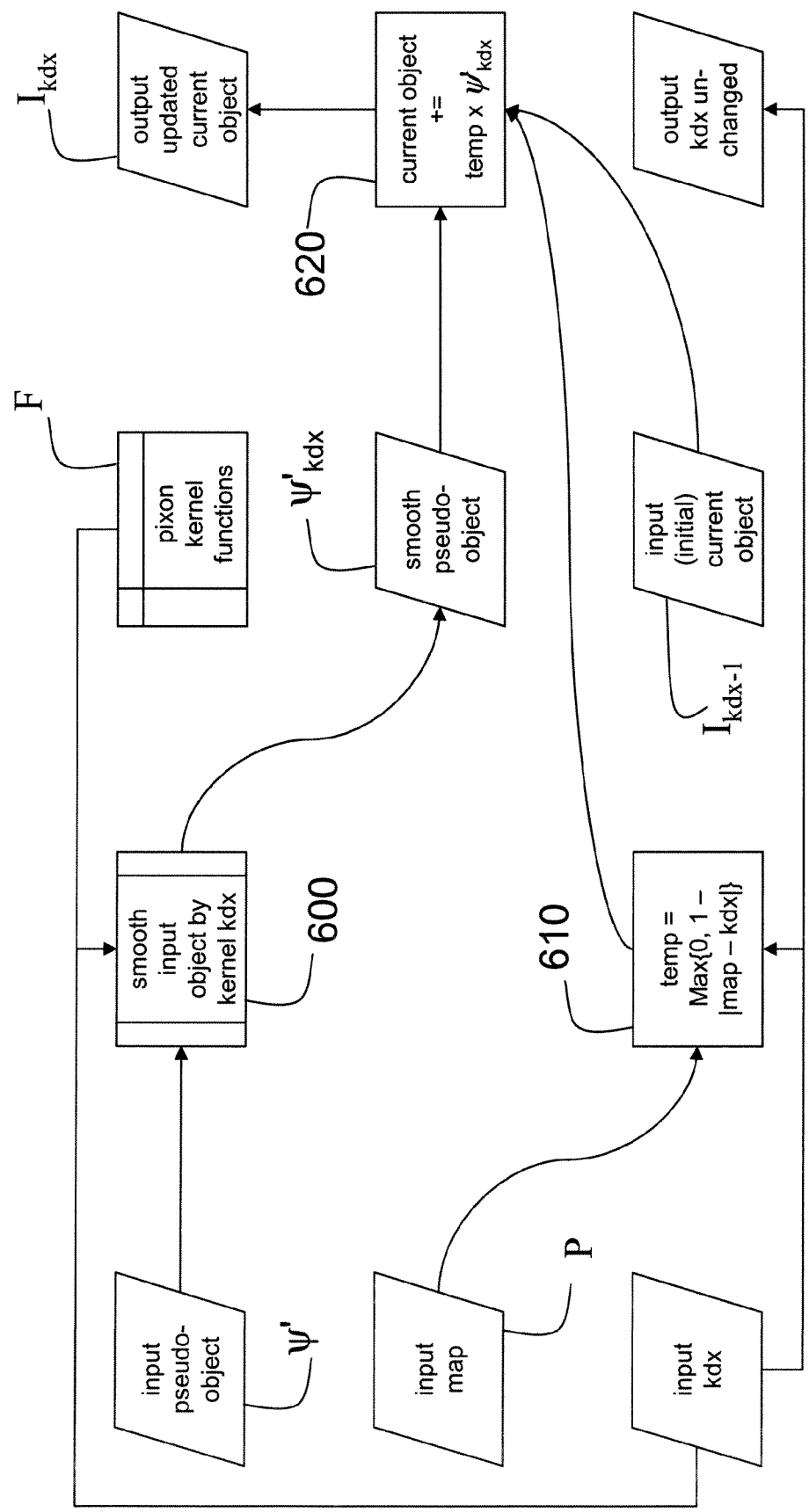
FIG. 6 is a flowchart illustrating a single-kernel function forward update of the forward pixon smoothing operation.
Figure 7:
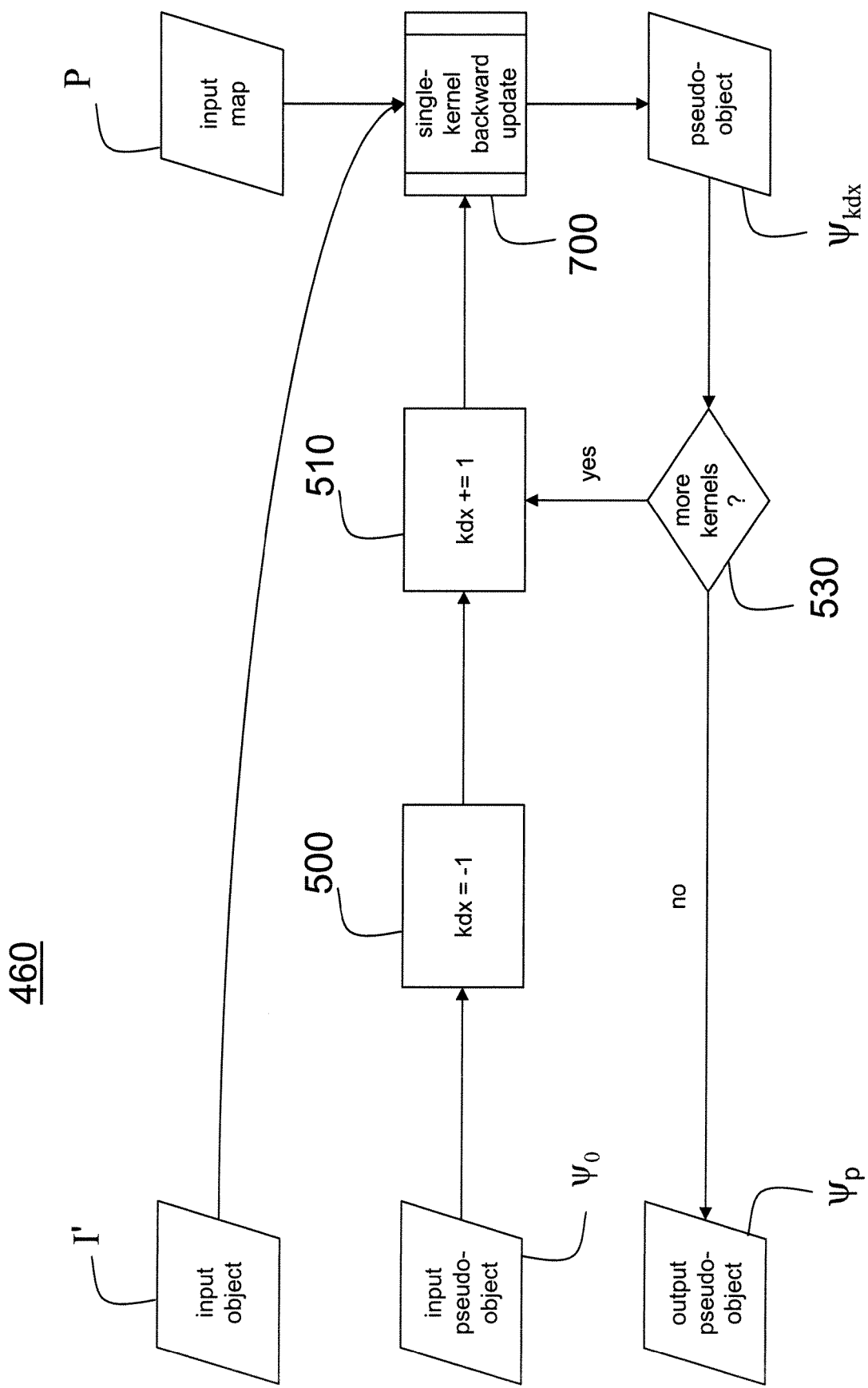
FIG. 7 is a flowchart illustrating an example of a backward pixon smoothing operation.
Figure 8:
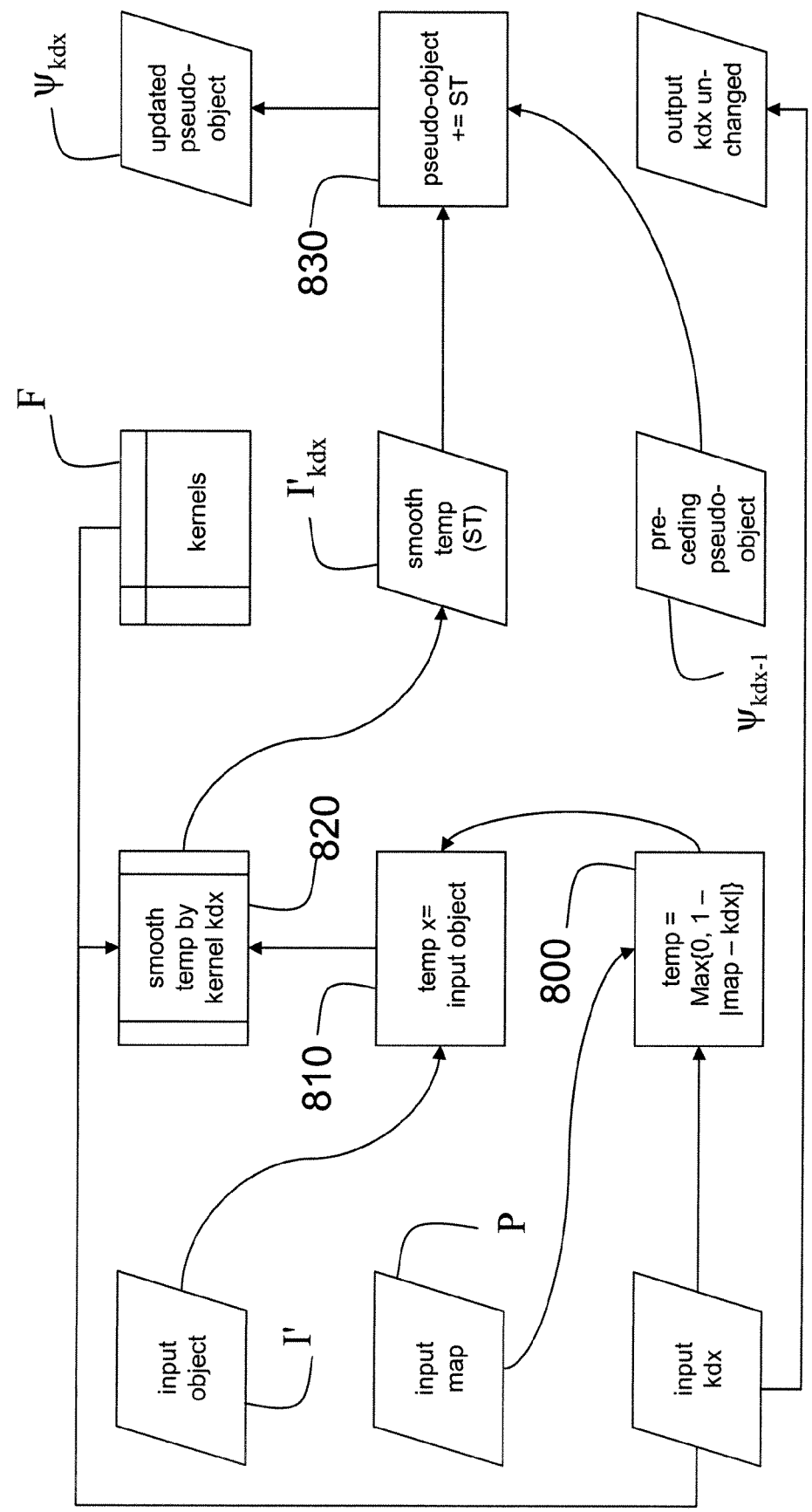
FIG. 8 is a flowchart illustrating a single-kernel function backward update of the backward pixon smoothing operation.

Each iteration includes, in addition, to the standard features of an OSEM algorithm, a forward pixon smoothing operation (step 450) and a backward pixon smoothing operation (step 460). The forward pixon smoothing operation (step 450), which is described in more detail in connection with FIGS. 5 and 6, is applied to the input object at the beginning of the iteration before the loop over the subsets is entered. The backward pixon smoothing operation (step 460), which is described in more detail in connection with FIGS. 7 and 8, is applied when the loop over the subsets is completed.

Pixon Smoothing

Pixon smoothing can be viewed as averaging values of an object over a specific volume (in 3D) defined by the pixon kernel function. The smoothing operation can be written as a matrix operation using a pixon kernel operator K, such that the (smoothed) image object $I_\alpha$ is given by applying the pixon kernel operator K to a pseudo-image object $\psi'$:

$$I_\alpha = \sum_\beta K_{\alpha\beta}\psi'_\beta$$

"Pseudo" indicates that the smoothing operation can be understood as a transformation (using the pixon kernel operator K) from a (pseudo-)object space, i.e. the pre-Pixon smoothing space, to the object space of the 3D image object I. Applying the transpose operator of the pixon kernel operator, $K^T$, then projects from the object space back into the pseudo-object space.

In many cases, the smoothing operation is a convolution operation given by:

$$I_\alpha = \sum_\beta K_{\alpha-\beta}\psi'_\beta$$

Convolutions can be calculated, for example, by a direct summation for small pixon kernel functions and by fast Fourier transforms (FFTs) for large pixon kernel functions. If the pixon kernel function can be factorized, a product of operators can be applied to simplify the calculation.

Pixon kernel functions can be discrete or continuous. They are defined over a volume that surrounds an object point. The volume can be limited (over one or more object points) or extend over the complete object space. Examples for 3D pixon kernel functions include a Gaussian function, an inverted paraboloid, or a function $f(x;\beta)=(1+\beta x^2)^{-1/\beta^2}$, which approximates the Gaussian and parabolic functions for $\beta$-values of zero or infinity, wherein the parameter x can represent the radius or depend on the direction.

The shapes of the kernel functions can be symmetric, or they can be adjusted in response to a form prevailing in the image object I. Within the shape of the pixon kernel functions, one can weigh the contribution of an object point. A limiting case of a pixon kernel function is the delta-function, in which the pixon smoothed object and the unsmoothed object are identical.

Forward Pixon Smoothing

During the forward pixon smoothing operation (step 450), one repetitively smoothes each object point of the pseudo-object $\psi'$ over pixon kernel functions, which are specifically assigned to each object point by the pixon map P. In accordance with the above discussed use of the pixon kernel operator K, an input object that is provided to a forward pixon smoothing operation is called a "pseudo-object" $\psi'$.

FIG. 5 shows the details associated with the pixon forward smoothing operation (step 450) applied to the pseudo-object $\psi'$. Using the pixon map P, one builds a pixon smoothed object $I_p$ by smoothing each object point of the pseudo-object $\psi'$ with whichever pixon kernel function the pixon map P assigns to that object point. Thus, the pixon smoothed object $I_p$ for the loop over the subset is composed by smoothing the pseudo-object $\psi'$. This smoothing includes iteratively considering each of the provided pixon kernel functions. Thus, each object point is smoothed with its corresponding pixon kernel function as indicated in the pixon map P. For the first iteration, one prepares an initial image object $I_0$ with the dimension of the object that is smoothed, and with data points having value zero, and a kernel pointer kdx (identifying the kernel function) (steps 510 and 540).

The pseudo-object $\psi'$, the initial image object $I_0$, the kernel pointer kdx, and the pixon map P are also then provided to a single-kernel function forward update (step 520). Output parameters of the single-kernel function forward update (step 520) are the unchanged kernel pointer kdx and an updated image object $I_{kdx}$. At the end of each iteration, one determines whether another pixon kernel function update is necessary (step 530). If another update is necessary the kernel pointer kdx is increased (step 540). Otherwise, if all kernel functions have been considered, one assigns the updated image object $I_{kdx}$ to be the pixon smoothed object $I_p$. The pixon smoothed object $I_p$ can be used, for example, as an input object of the loop over the subsets.

FIG. 6 shows, in detail, the steps in the single-kernel function forward update (step 520) of an image object $I_{kdx-1}$ as discussed in connection with FIG. 5. The image object $I_{kdx-1}$ comprises smoothed values for all object points, for which the pixon map P indicated smoothing with pixon kernel functions identified by kernel pointers smaller than the current kernel pointer kdx. For the update, the pseudo-object $\psi'$ is smoothed with the kernel function indicated by the current kernel pointer kdx in the field F of pixon kernel functions (step 600). The result is a smoothed pseudo-object $\psi'_{kdx}$.

Then, one determines how much a data point is affected by the current kernel function (step 610). The corresponding calculation uses the pixon map P and the current value of the kernel pointer kdx to determine a temporary field, temp, which is zero if the object point is not affected. The temporary field, temp, has values between 0 and 1 when two kernel functions are used for the smoothing of the object point, and a value of 1 when only the current pixon kernel function is used for smoothing of the object point. For updating each affected object point of the image object $I_{kdx-1}$, one adds, to the current value of the image object $I_{kdx-1}$, the product of the values of the temporary field, temp, and of the smoothed pseudo-object $\psi'_{kdx}$ of that object point (step 620). The result is the updated image object $I_{kdx}$.

Backward Pixon Smoothing

Additionally, or as an alternative to the pixon forward smoothing with the operator K, a backward pixon smoothing can be used within the combined pixon smoothing and reconstruction algorithm. In this case, one generates a smoothed object with a transposed pixon operator $K^T$. FIG. 7 shows an exemplary backward pixon smoothing operation, which could be applied, e.g., in FIG. 4. Within the single-kernel backward update (step 700), one applies the transposed pixon kernel operator $K^T$ instead of the pixon kernel operator K of the single kernel forward update of FIG. 5 (step 520).

For the smoothing operation, one prepares the initial pseudo-object $\psi_o$ and the kernel pointer kdx, which indicates which one of the pixon kernel functions is applied during the single-kernel backward update. An input object I' (e.g., the output of the loop over the subsets) and the pixon map P are also used within the update to determine an updated pseudo-object $\psi_{kdx}$. One then evaluates whether to include a further pixon kernel function in the smoothing or whether all kernel functions have been considered, in which case the pseudo-object $\psi_{kdx}$ becomes the smoothed pseudo-object $\psi_p$. In the case of FIG. 4, the smoothed pseudo-object $\psi_p$ is the updated object $I_{update}$.

FIG. 8 shows an exemplary implementation of the transposed pixon Kernel $K^T$ for, e.g., the single-kernel backward update (step 700). In this case, one begins the procedure by selecting those data points of an input object I', the smoothed values of which have contributions of the smoothing with a specific pixon kernel function. Specifically, one calculates the entries of a temporary field, temp, by taking the maximum of zero or the difference between one and the modulus of the difference between the corresponding entry of the pixon map P and the value of the kernel pointer kdx (step 800). Then, one updates the temporary field, temp, by multiplying the temporary field, temp, with the input image I' (step 810). The updated temporary field, temp, contains only non-zero entries for those data points that are to be updated with the specific kernel function. The updated temporary field, temp, is then smoothed over a pixon kernel function (step 820), which is read from the field F of pixon kernel functions using the kernel counter kdx. The result is a smoothed object $I'_{kdx}$. As every data point of the updated temporary field, temp, is smoothed over the pixon kernel function, the number of data points of the smoothed object $I'_{kdx}$ with non-zero values is most probably larger than the number of non-zero data points of the updated temporary field, temp. Finally, the updated pseudo-object $\psi_{kdx}$ is created by adding the smoothed object $I'_{kdx}$ to the preceding pseudo-object $\psi_{kdx-1}$ (step 830).

Pixon OSEM Algorithm

Figure 9:
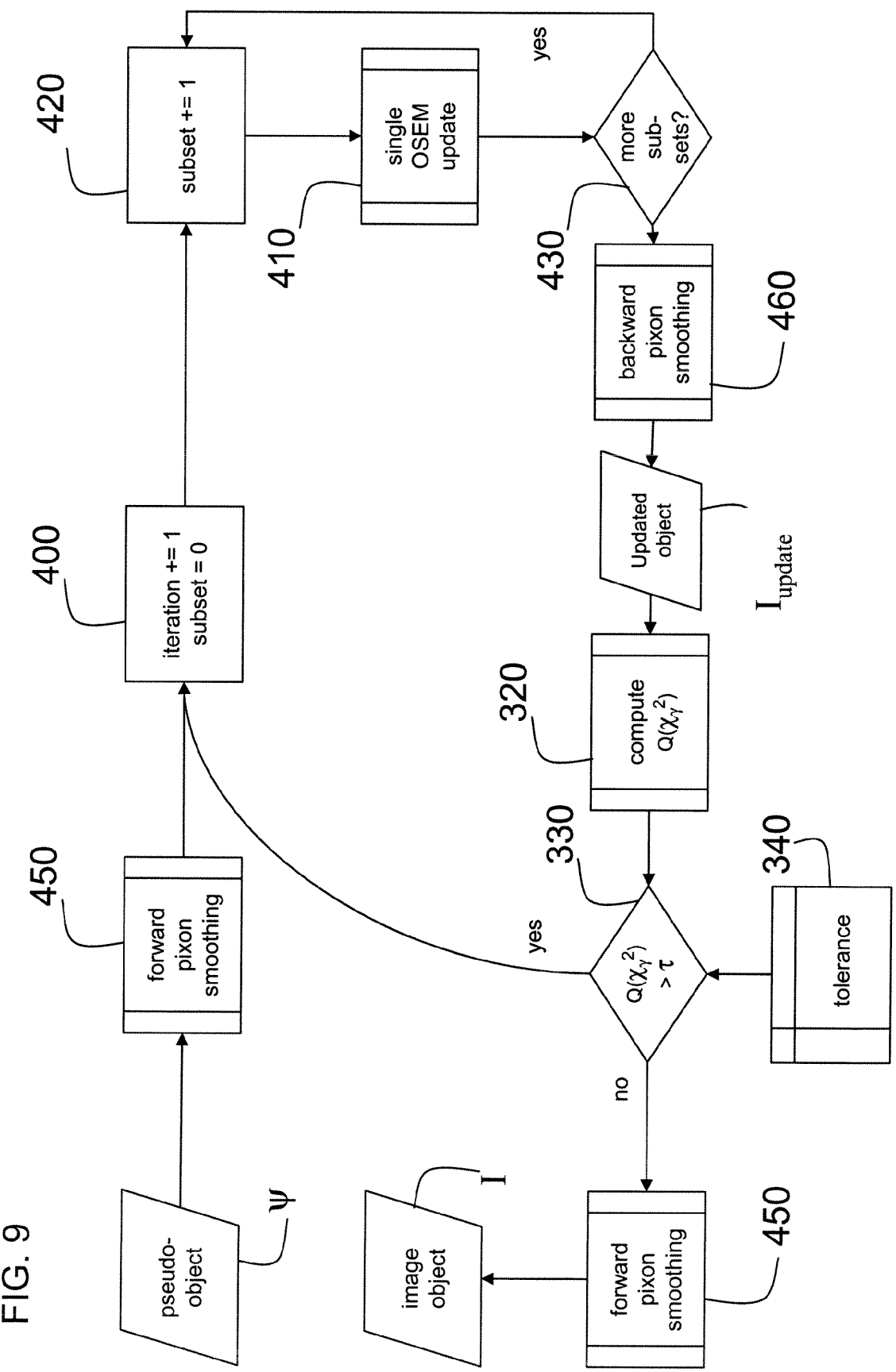
FIG. 9 is a flowchart illustrating a second example of a combined pixon smoothing and reconstruction algorithm based on an OSEM update.

FIG. 9 illustrates another example of a pixon reconstruction algorithm based on an OSEM algorithm as discussed in connection with FIG. 4. Within the pixon reconstruction algorithm, pixon forward smoothing operations (step 450) based on pixon operator K are applied before entering the iteration cycle and after the comparison of the stopping criterion, $Q(\chi_Y^2)$, with the threshold, $\tau$ (step 250), as discussed in connection with FIG. 3. A pixon backward smoothing operation (step 460) based on the transposed pixon operator $K^T$ is applied before calculating $Q(\chi_Y^2)$ (step 320).

Figure 10:
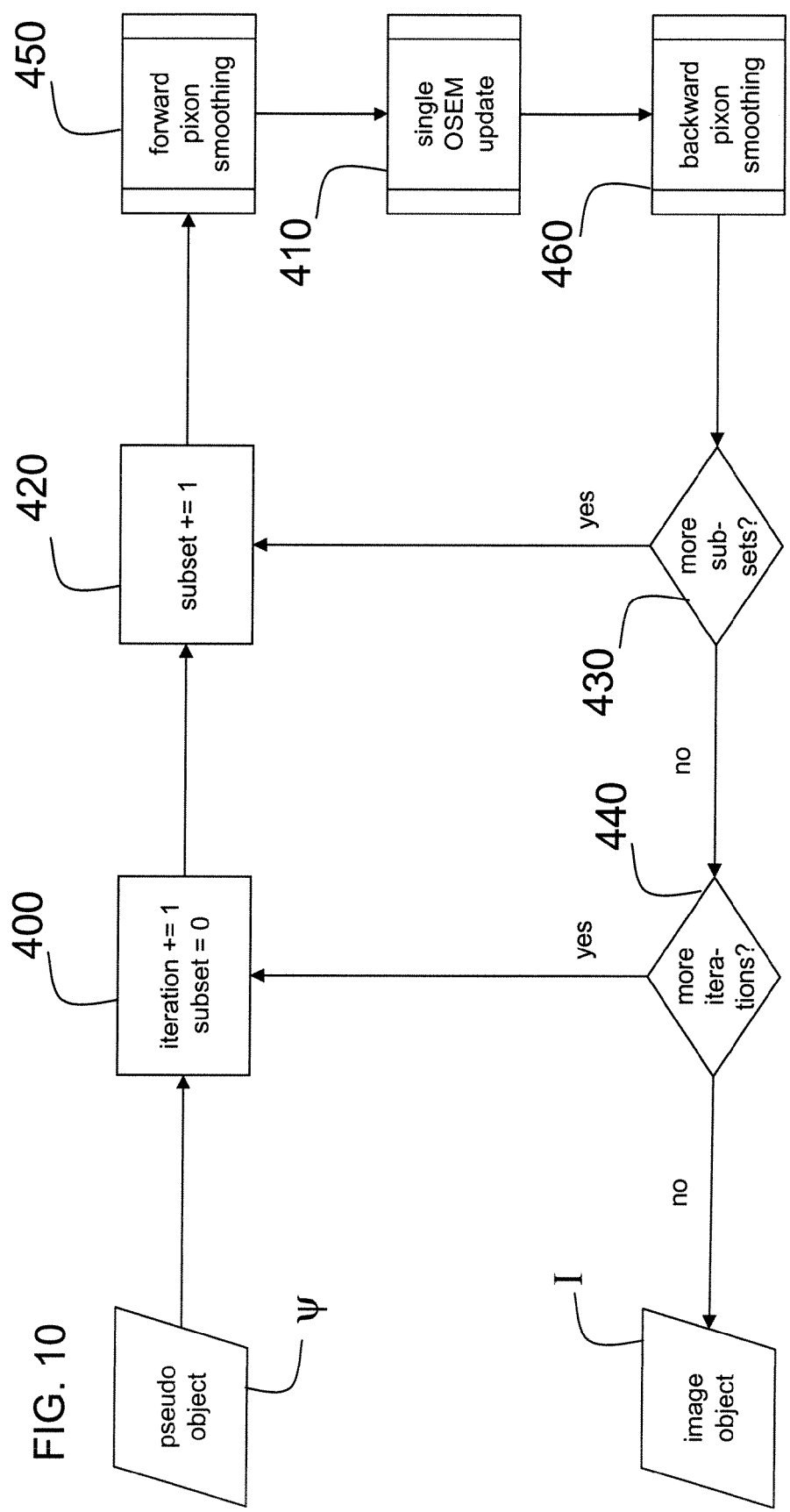
FIG. 10 is a flowchart illustrating a third example of a combined pixon smoothing and reconstruction algorithm based on an OSEM update with a forward and a backward pixon smoothing operation within a loop over subsets.
Figure 11:
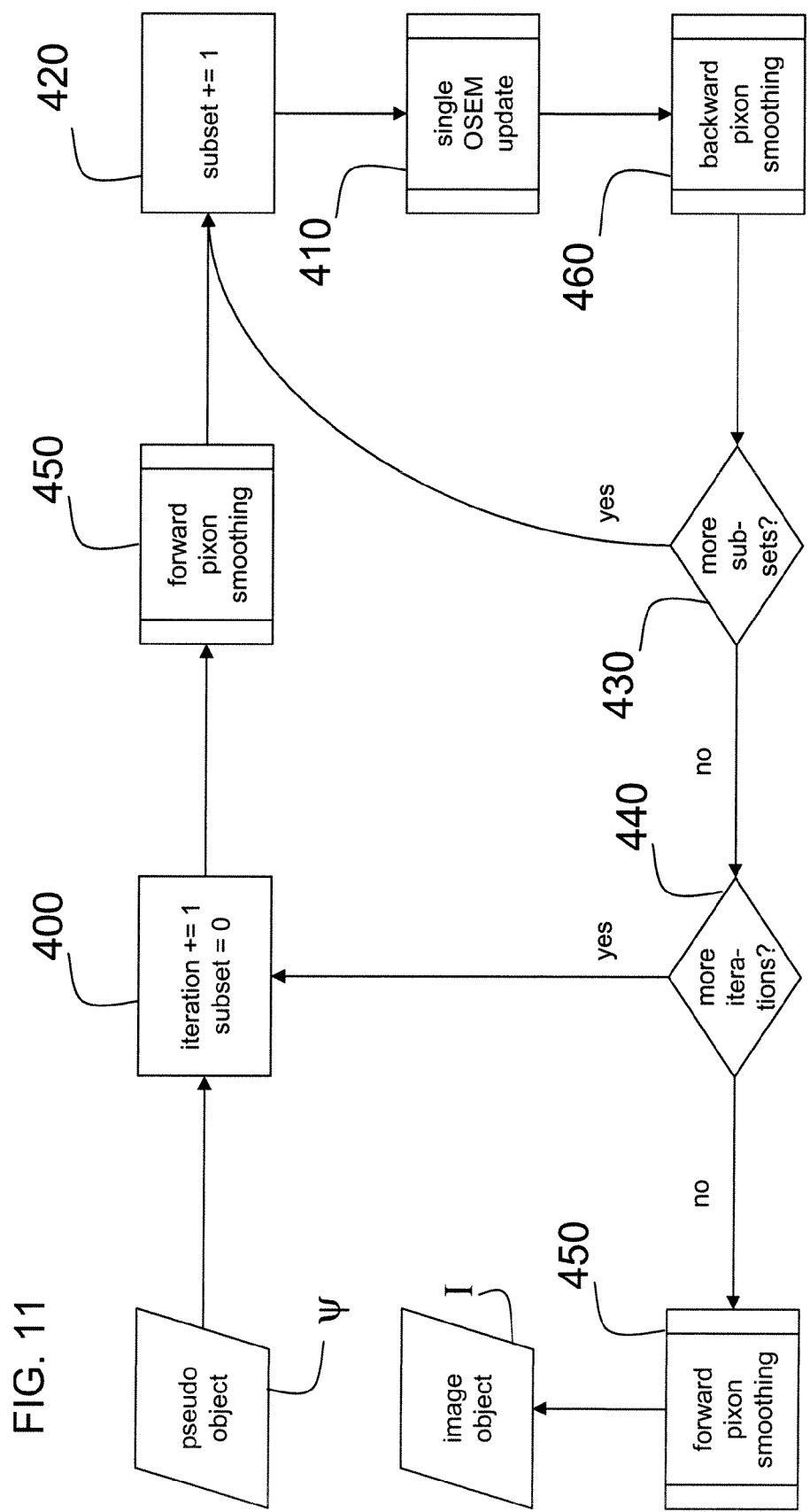
FIG. 11 is a flowchart illustrating a fourth example of a combined pixon smoothing and reconstruction algorithm based on an OSEM update with a forward pixon smoothing operation in an iteration and a backward pixon smoothing operation within a loop over subsets.

Alternatively, or in addition, smoothing operations can be applied within the loop over the subsets. For example, FIG. 10 shows a forward pixon smoothing operation (step 450) before the single OSEM update (step 410) and a backward pixon smoothing operation (step 460) after the single OSEM update (step 410). A combination of a single forward pixon smoothing operation (step 450) within the iteration cycle and a backward pixon smoothing operation (step 460) following the single OSEM update (step 410) within the loop over the subsets is shown in FIG. 11.

Figure 12:
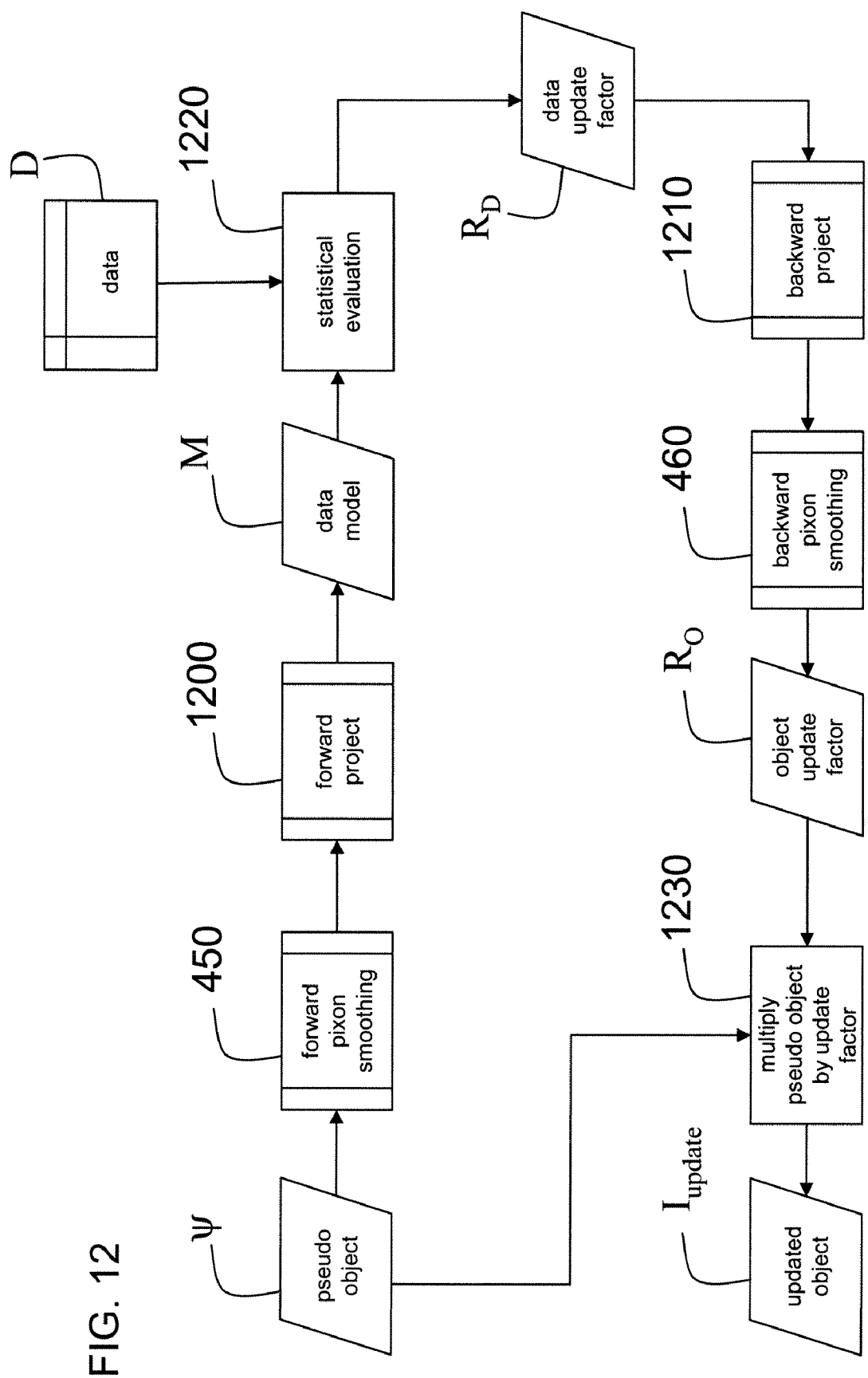
FIG. 12 is a flowchart illustrating a single OSEM update operation, which is combined with a forward and a backward pixon smoothing operation.

When pixon smoothing is applied within the single OSEM update (step 410), the details of which are shown in FIG. 12, a forward pixon smoothing operation (step 450) can be applied, for example, before a forward projection (step 1200) from object space into data space, and a backward pixon smoothing operation (step 460) can be applied following a backward projection (step 1210) from data space into object space.

The forward projection projects a pseudo (input) object $\psi$ from object space into data space (step 1200). Object space and data space are related to each other through the nuclear imaging system 100 by the system matrix H. A "forward projection" is an application of the system matrix H to an object in object space. The result of a forward projection is a "projected object" in data space. For example, projecting an estimated image into data space results in a data model $M_i$ of that estimated image:

$$M_i = \sum_\alpha H_{i\alpha} I_\alpha$$

However, the system matrix H is rarely applied as a matrix multiplication. Instead, it is represented as a product of operators $H_n$:

$$H = H_n \otimes \ldots \otimes H_2 \otimes H_1$$

Corresponding to the forward projection, the backward projection from the data space into object space can be described as an application of the transpose $H^T$ of the system matrix H:

$$I_\alpha = \sum_i H_{\alpha i} M_i$$

The transpose $H^T$ is also rarely applied as a matrix multiplication. Instead, it too is represented as a product of operators:

$$H^T = H_1^T \otimes H_2^T \otimes \ldots \otimes H_n^T$$

The pseudo objcet $\psi$ can be either an initial object or a preceding updated object $I_{update}$. In the case of an OSEM algorithm, a specific restriction of non-negativity applies to the initial input object.

Referring to FIG. 12, the result of the forward projection (step 1200) is the corresponding data model M in data space. The data model M has J entries $m_j$. Thus, it has the same number of entries as the data set D, the $d_j$ entries of which are measured with the detectors 110 of the imaging system 100. The data model M is statistically evaluated (step 1220). The statistical evaluation is specific to the algorithm and relates the data model M and the measured data set D. For the OSEM algorithm, the statistical evaluation considers the data of the current subset. The result, a data update factor $R_D$ for each entry in the data model, is projected back into object space using the backward projection (step 1210). This results in an object update factor $R_O$, which is applied to the input object $\psi$ (step 1230) to provide the updated object $I_{update}$.

The updated object $I_{update}$ is now used as an input object for the next iteration step. Thus, each iteration step begins with a new estimate of the object. After several iteration steps, the estimates converge during reconstruction to, for example, the distribution of the radioactive substance administered to the patient.

Pixon Map Update

Smoothing operations can be based on constraining maps that provide information about the smoothing itself. An example of a constraining map associated to object points is the pixon map P used for pixon smoothing. The pixon map P is based on the data set D and an object being an estimation of the final 3D image object. When one determines the pixon map P, one statistically evaluates the effect of smoothing the object with a specific pixon kernel function. Thus, the pixon map P depends on the underlying object.

During the reconstruction process of the combined smoothing and reconstruction algorithm (step 200), one iteratively improves the estimation of the final image object I. Thus, one can adapt the pixon smoothing to the latest estimated object by determining an updated pixon map P, the construction of which is then based on the latest estimated object.

Figure 13:
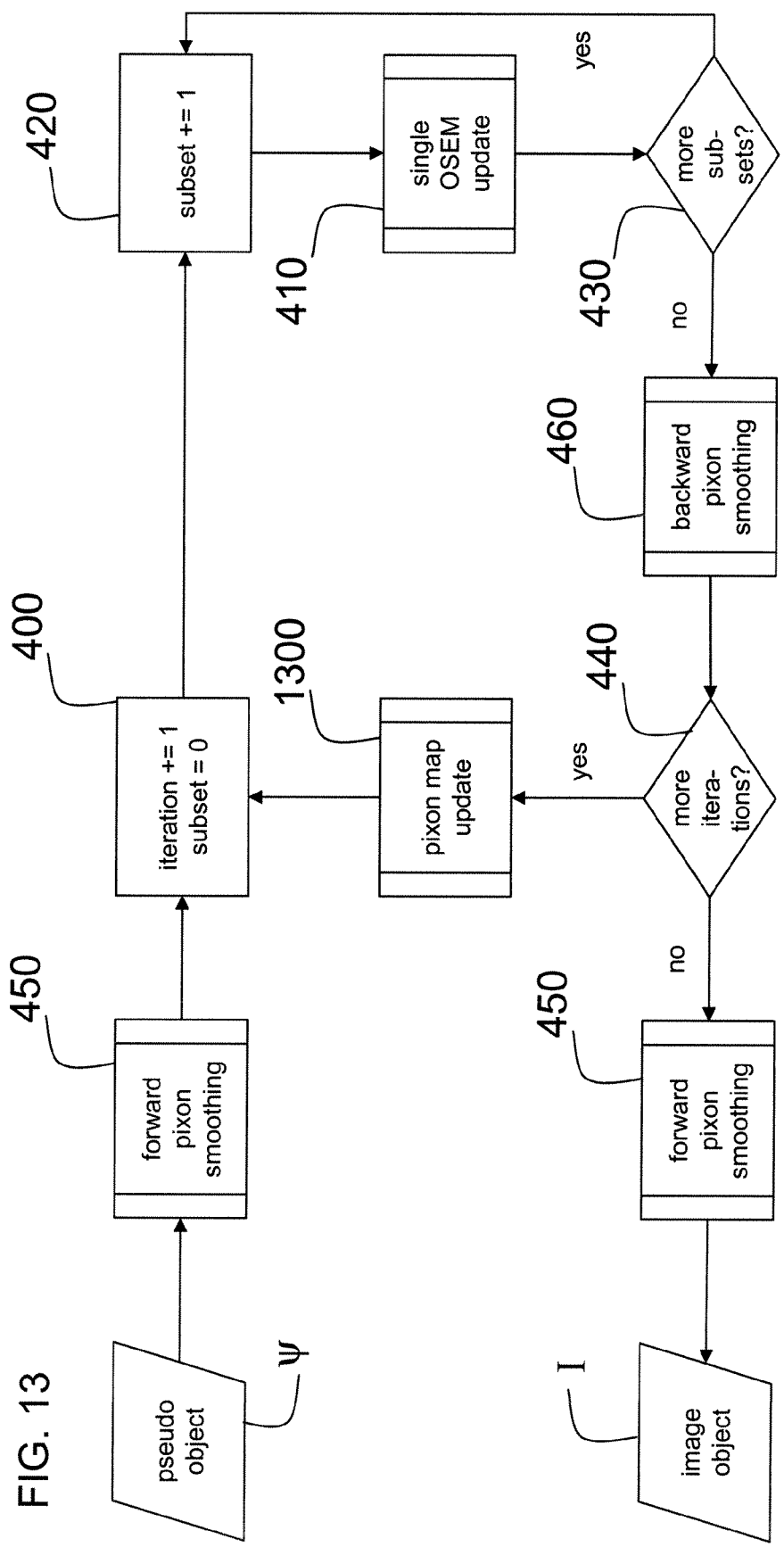
FIG. 13 is a flowchart illustrating a fifth example of a combined pixon smoothing and reconstruction algorithm based on an OSEM update with a pixon map update between iterations.
Figure 14:
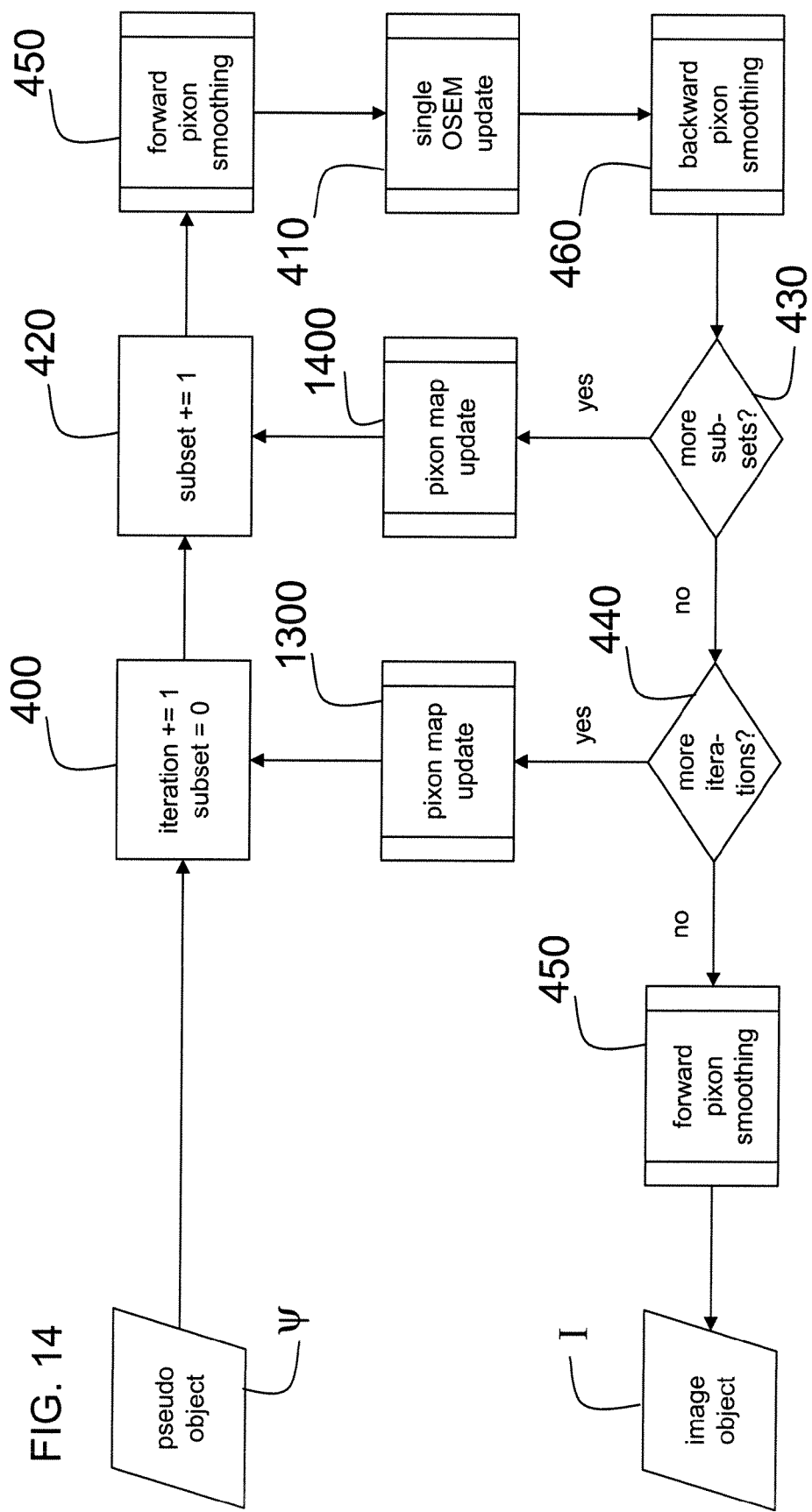
FIG. 14 is a flowchart illustrating a sixth example of a combined pixon smoothing and reconstruction algorithm based on an OSEM update with a pixon map update between iterations and with a pixon map update between subset loops.

One can update the pixon map throughout the combined smoothing and reconstruction algorithm. As an example based on the algorithm shown in FIG. 9, FIG. 13 shows an update operation of the pixon map (step 1300) at the end of each iteration cycle. Alternatively, or in addition, one can update the pixon map after each OSEM update within the subset loop. As an example based on the algorithm shown in FIG. 10, FIG. 14 shows the case of a pixon map update (step 1300) in the iteration and a pixon map update (step 1400) in the loop over subsets.

To avoid excessive computational effort arising from the construction of the pixon map, one may wish to control when an update takes place and when it does not. As an exemplary control parameter, one can evaluate a change between the object that was used for the pixon map construction, and the most recent updated object $I_{update}$. Only if this change is significant will one construct a new pixon map based on the updated object $I_{update}$. A method to evaluate the change of the object can be based on the quality of the object as given, for example, by the stop-criterion discussed in connection with FIG. 3.

Figure 15:
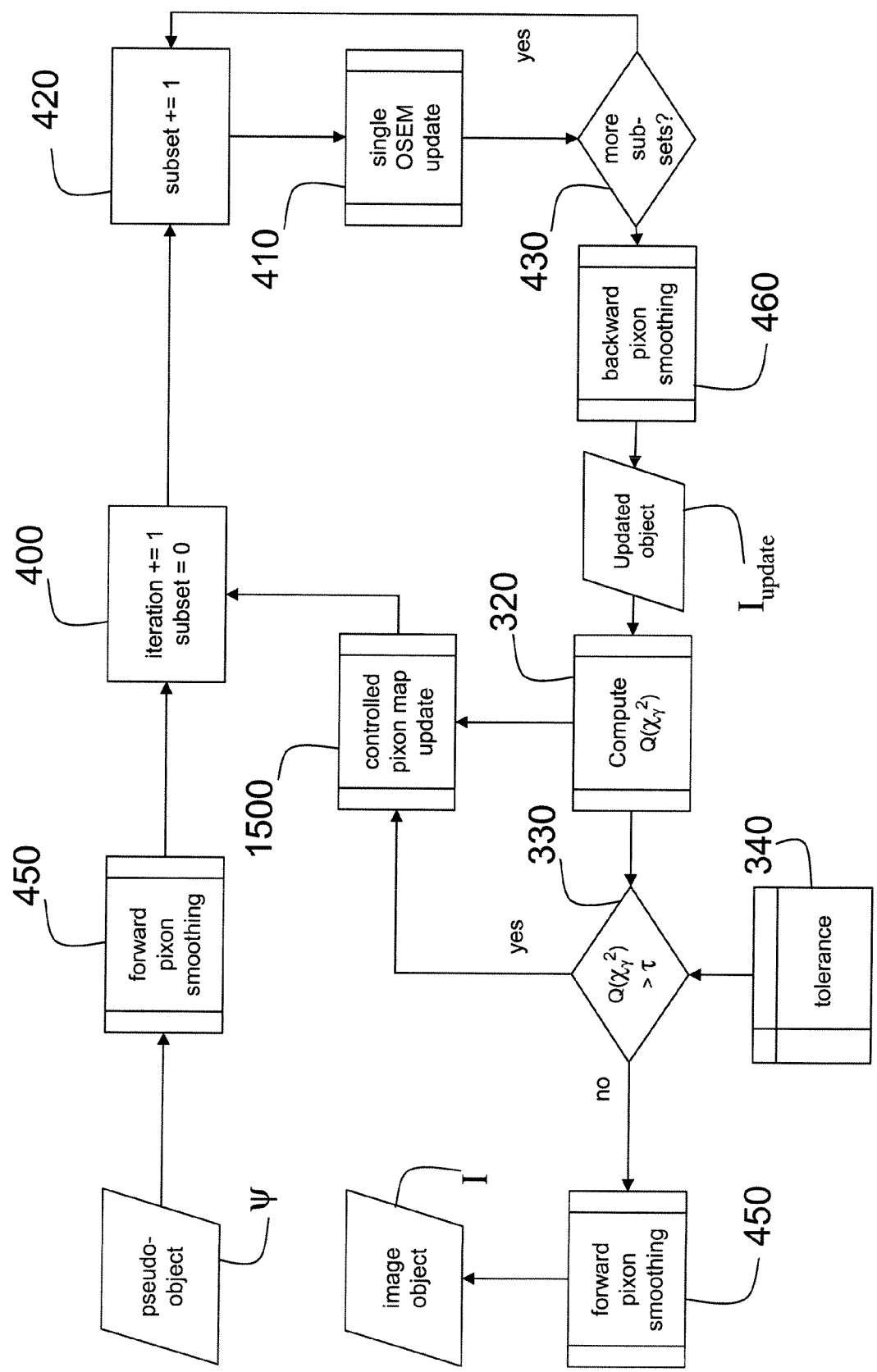
FIG. 15 is a flowchart illustrating a seventh example of a combined pixon smoothing and reconstruction algorithm based on an OSEM update with a controlled pixon map update between iterations.

Details of such a quality controlled pixon update are shown in FIG. 15, in which one determines the stop-criterion, $Q(\chi_\gamma^2)$, at the end of each iteration (step 320), and uses it to evaluate whether another iteration is necessary (step 330). Before a next iteration, one uses the stop-criterion, $Q(\chi_\gamma^2)$ to determine whether the pixon map should be updated (step 1500). Thus, one evaluates, for example, whether the change of the stop-criterion, $Q(\chi_\gamma^2)$, associated with the last construction of the pixon map P to the current stop-criterion, $Q(\chi_\gamma^2)$, associated with the object $I_{update}$ indicates that the combined pixon smoothing and reconstruction algorithm could benefit from a newly constructed pixon map.

Pixon NNLS Algorithms

FIGS. 16 to 19 show several combined smoothing and reconstruction algorithms that are based on a non-negative least square (NNLS) fit. Details of such an algorithm are disclosed in the co-pending U.S. Published Patent Application No. 20080270465, entitled "NNLS image reconstruction," by A. Yahil and H. Vija, filed on even date herewith, the contents of which are herein incorporated by reference. The following example algorithms are based on the conjugate gradient method and pixon smoothing, wherein the pixon smoothing is again exemplary for smoothing operations that constrain the reconstruction.

Figure 16:
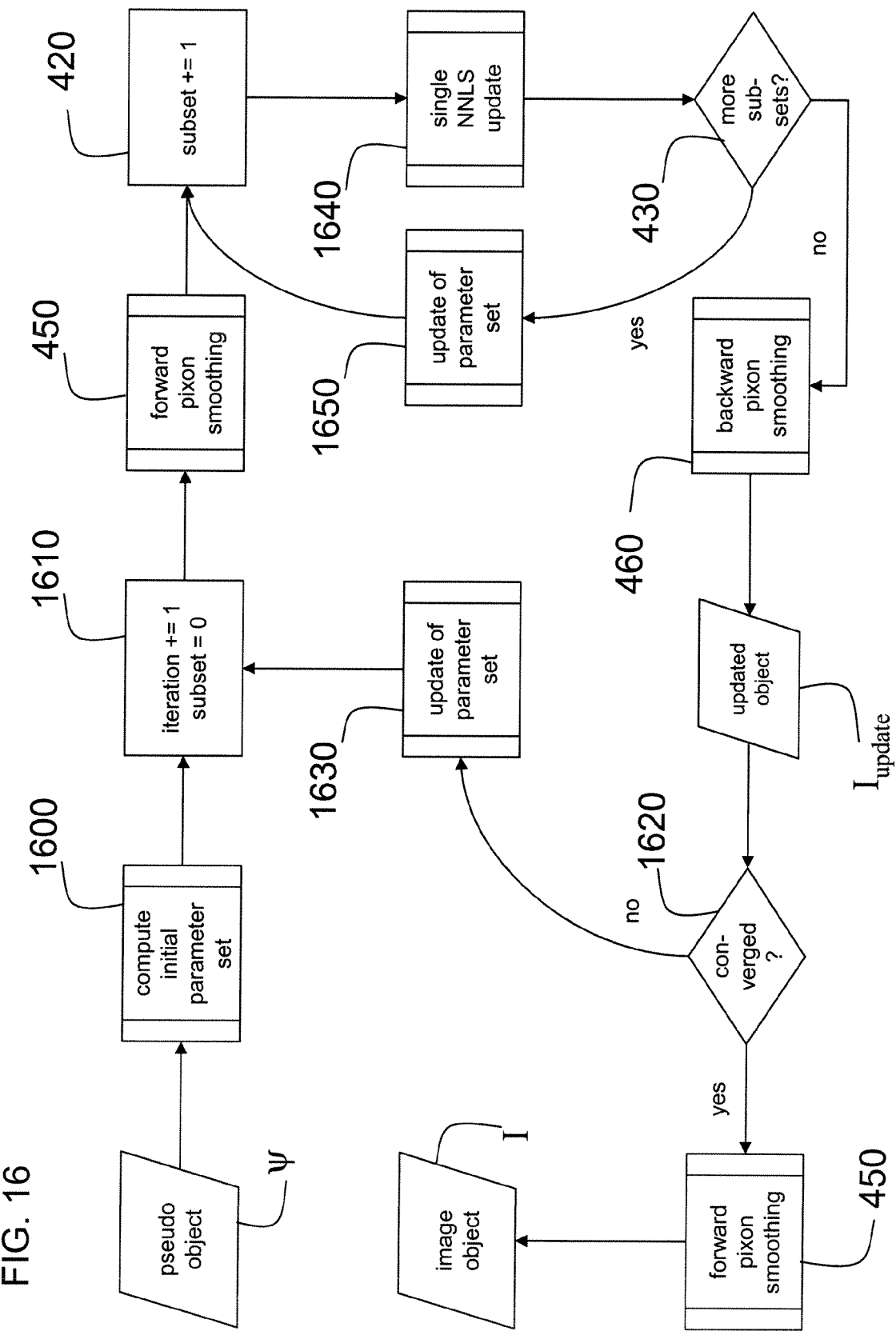
FIG. 16 is a flowchart illustrating a first example of a combined pixon smoothing and reconstruction algorithm based on a NNLS update with a forward and a backward pixon smoothing operation within an iteration.

In the flowchart of FIG. 16, one selects an initial object ψ and computes an initial set of parameters for this initial object ψ (step 1600). The set of parameters includes the gradient and the conjugate gradient of the input object ψ. A specific constraint of the NNLS algorithm is the non-negativity of the input object. Accordingly, for an object point with a value zero, the corresponding gradient value is set to zero.

An iterative cycle is indicated by increasing the increment, iteration (step 1610), and a convergence test (step 1620), which can be used due to the convergence of NNLS algorithms. In the convergence test (step 1620), one compares the updated object $I_{update}$ with a preceding updated object $I_{update-1}$ and evaluates whether the change of the updated object $I_{update}$ falls within a predetermined convergence limit. If it does, one smoothes the updated image $I_{update}$ with a last pixon smoothing operation (step 460) and assigns the result to be the final image object I. If the updated object $I_{update}$ does not fulfill the convergence test, one updates the parameter set (step 1630) based on the updated object $I_{update}$ and enters the next iteration.

Within the iterative cycle, one applies one or more pixon smoothing operations. In the case of FIG. 16, a forward pixon smoothing operation (step 450) precedes a single NNLS update (step 1640) and a backward pixon smoothing operation (step 460) follows the single NNLS update (step 1640). The single NNLS update (step 1640) can be based on the complete data set D or, as the OSEM algorithm, it can be based on a loop over subsets. The latter case is shown in FIG. 16 by incrementing a subset (step 420) and testing whether all subsets were considered (step 430). During the subset loop, the parameter set is updated (step 1650) after each NNLS update (step 1640).

Figure 17:
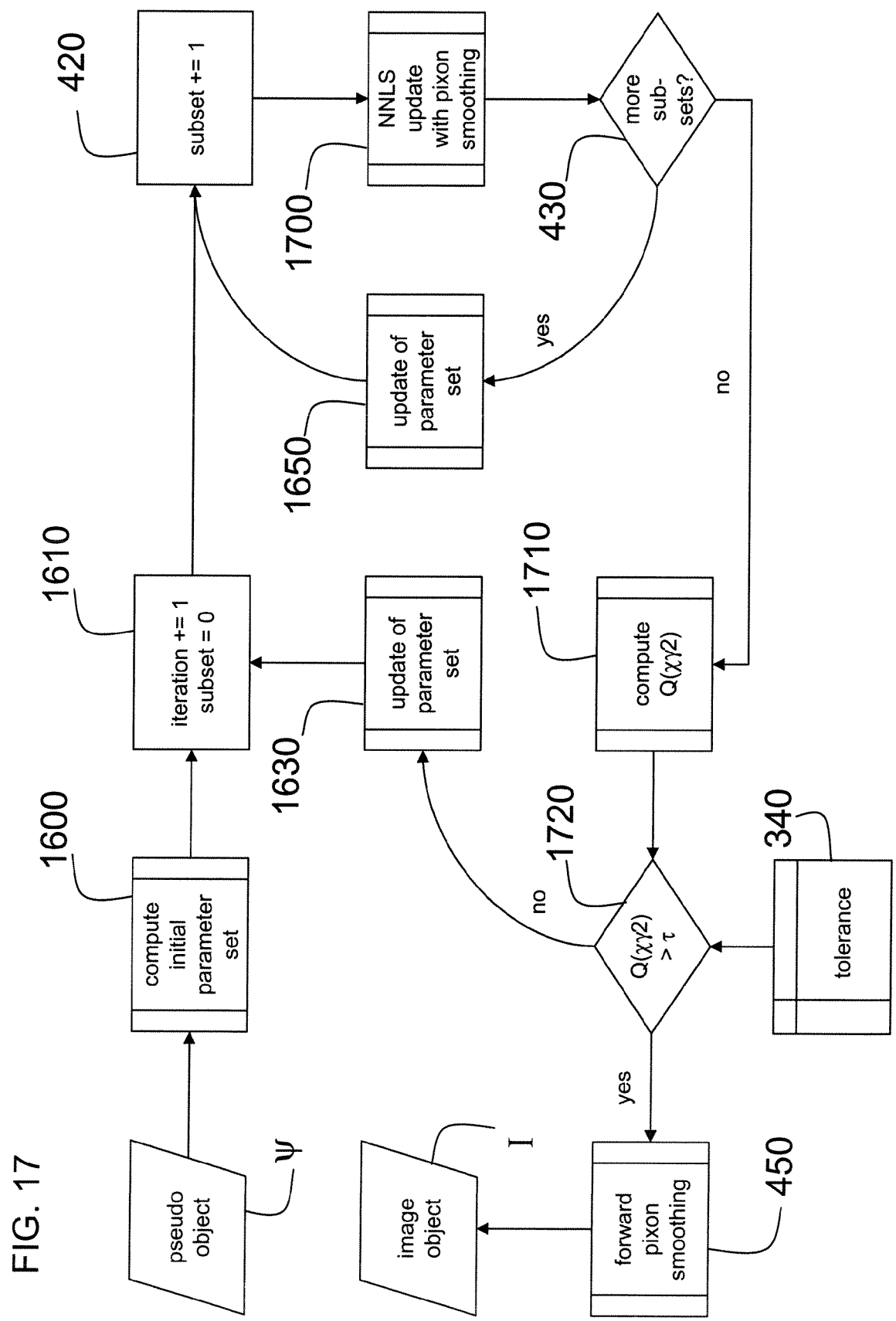
FIG. 17 is a flowchart illustrating a second example of a combined pixon smoothing and reconstruction algorithm based on a NNLS update with a NNLS update that includes one or more pixon smoothing operations.

FIG. 17 shows a NNLS update in which pixon smoothing is applied (step 1700). In this case, the pixon smoothing operation is integrated into the calculations of the single NNLS update. In the single NNLS update, one can replace one or more projections from object space into data space or from data space into object space with combined operations of one or more pixon smoothing operations and a projection operation. For example, one may replace a forward projection with a forward pixon smoothing operation followed by one or more forward projection of the smoothed object. Alternatively, or in addition, one can perform one or more backward pixon smoothing operations subsequent to a backward projection of the update operation.

Within the NNLS update, forward and backward projections occur, for example, when one calculates a distance parameter and a preliminary gradient parameter, which are defined as objects in object space. Additionally, a preconditioning parameter of the NNLS algorithm can be pixon smoothed after being backprojected from data space into object space. These parameter objects can be smoothed before they are used in the calculation of the updated object. They do not represent estimates of the final image object, but the pixon smoothing operation can be applied to any object in object space. This is similar to the case of the OSEM based algorithms, the OSEM updates of which included a pixon smoothing operation when generating the object correction factor $R_o$.

Additionally, FIG. 17 shows an alternative to the convergence controlled decision of FIG. 16. As was the case for the OSEM algorithm, one can calculate a stop-criterion, $Q(\chi_\gamma^2)$ (step 1710). In this case, a quality evaluation (step 1720) determines whether a data model, corresponding to the updated object $I_{update}$ of each iteration, fulfills a preset condition.

During execution of the algorithm, one determines estimated objects that converge to the final image object I. Thus, as for the OSEM algorithms discussed in connection with FIGS. 13 to 15, one may be able to optimize the pixon smoothing by updating the pixon map P.

Figure 18:
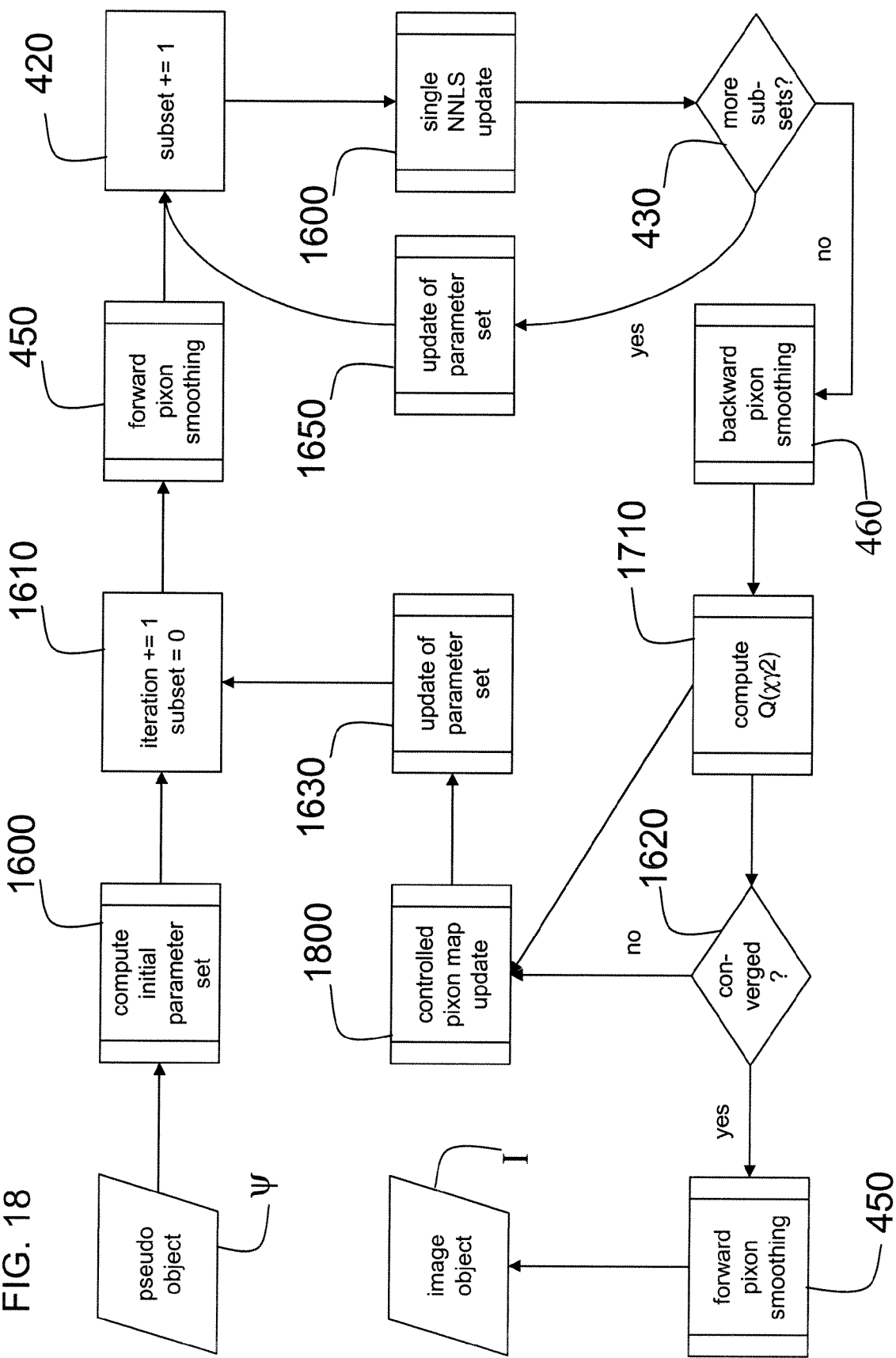
FIG. 18 is a flowchart illustrating a third example of a combined pixon smoothing and reconstruction algorithm based on a NNLS update with a controlled pixon map.

FIG. 18 shows a pixon map update (step 1800) before the update of the parameter set (step 1630). Thus, in the flowchart shown in FIG. 18, one calculates a new pixon map P on the basis of the updated object $I_{update}$ of the preceding iteration before entering the next iteration cycle.

As for the OSEM based algorithms, one may wish to update the pixon map only when the updated object $I_{update}$ changed significantly. For example, one may control the pixon map update depending on the calculated stop-criterion, $Q(\chi_\gamma^2)$, as indicated in FIG. 18 by the arrow pointing from the calculation of the stop-criterion, $Q(\chi_\gamma^2)$, (step 1710) to the pixon map update (step 1800).

Figure 19:
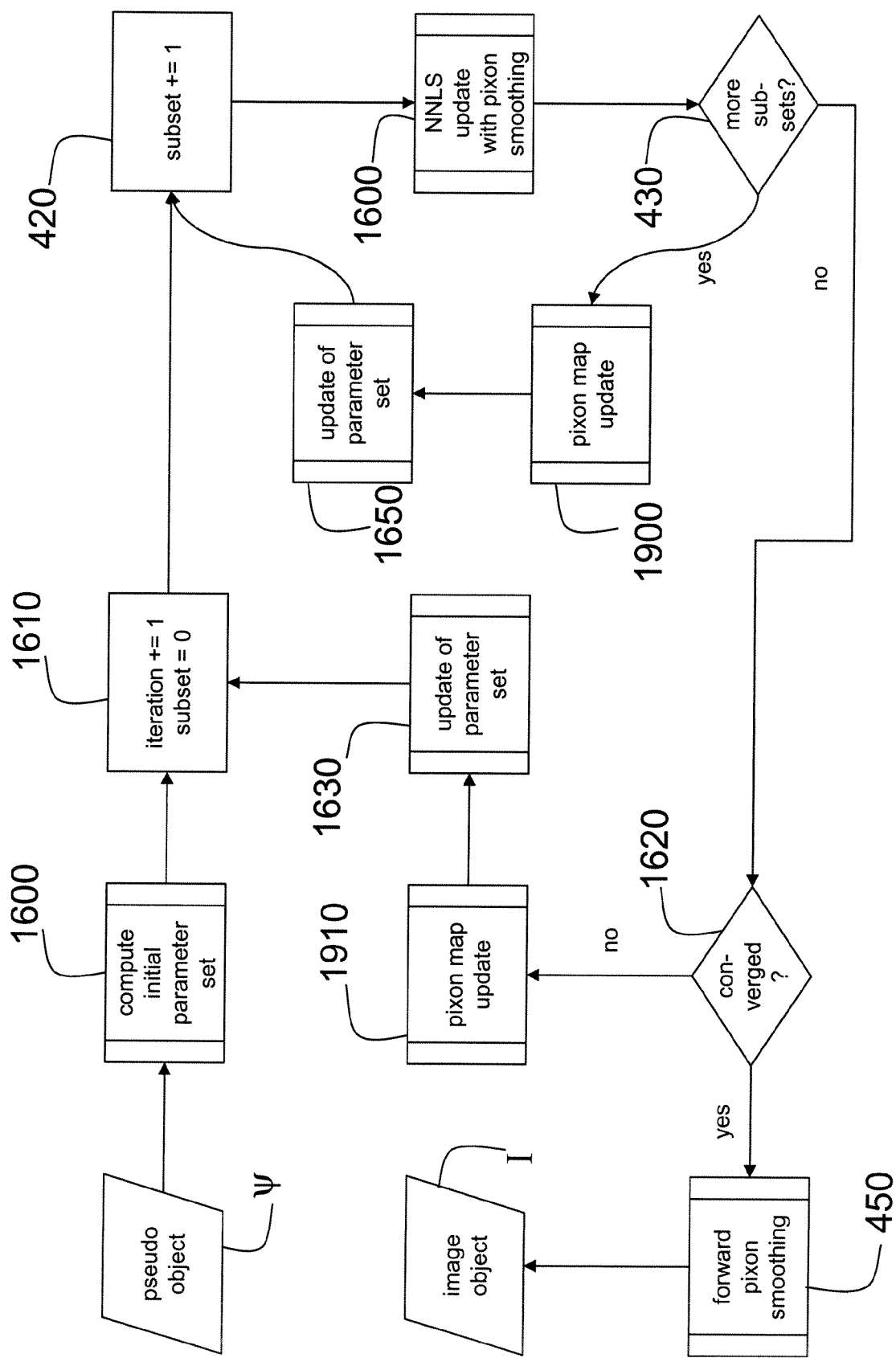
FIG. 19 is a flowchart illustrating a fourth example of a combined pixon smoothing and reconstruction algorithm based on a NNLS update with a pixon map update between iterations and with a pixon map update between subset iterations.

FIG. 19 shows an algorithm based on a NNLS update, in which the pixon map is updated before the set of parameters is updated. Thus, the pixon map is updated both for every new subset (step 1900) and for every new iteration (step 1910).

Modular Reconstruction

Figure 20:
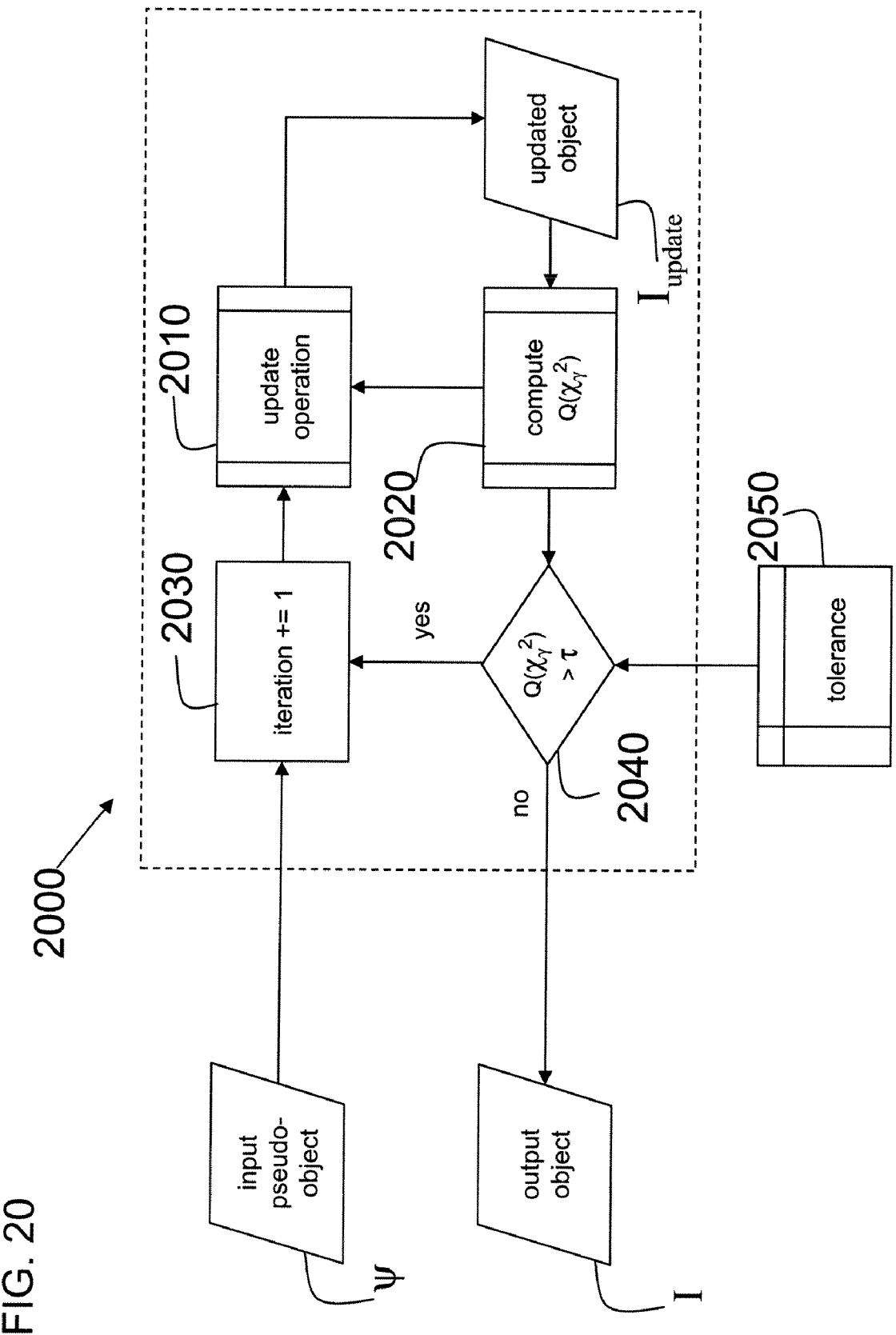
FIG. 20 is a flowchart illustrating a general concept of a modular reconstruction system.

FIG. 20 shows the details of a general concept of a modular reconstruction system. Specific examples were described with respect to FIGS. 2 to 19. In general, the pseudo-object ψ is updated using an iterative algorithm (step 2000), which results in an output object I. In the iterative algorithm (step 2000), one determines the updated object $I_{update}$ for an input object using an update operation (step 2010). The update operation is based on a set of modular operations that include conventional image reconstruction, pixon smoothing, and combined pixon smoothing and reconstruction. The Pixon smoothing update operation and the pixon smoothing and reconstruction update operation can include its own construction and/or update of the involved pixon maps or they can use a pre-constructed pixon map.

A control unit controls the order in which the iterative algorithm (step 2000) applies the modular update operations (step 2010). The control unit can use a manual input of a user. In addition, or alternatively, an automated system can be used that is based, for example, on the quality of the reconstructed image, or the quality of a constructed pixon map. This is indicated in FIG. 20 by the arrow pointing from a determination of the stop-criterion, $Q(\chi_\gamma^2)$, (step 2020) to the update operation (step 2010).

In FIG. 20, an iterative cycle is indicated by increasing an increment, iteration (step 2030). As discussed in connection with the OSEM and NNLS examples of the combined pixon smoothing and reconstruction algorithms, the number of iterations can be preset, manually assigned, or a stop-criterion, $Q(\chi_\gamma^2)$, can be calculated (step 2020) after completing an iteration step. In the case shown in FIG. 20, a quality evaluation (step 2040) determines whether a data model, corresponding to an updated object $I_{update}$ of each iteration, fulfills a preset condition. For example, one compares a stop-criterion that characterizes the quality of the estimate with a threshold, τ, which is stored in a tolerance table 2050.

Figure 21:
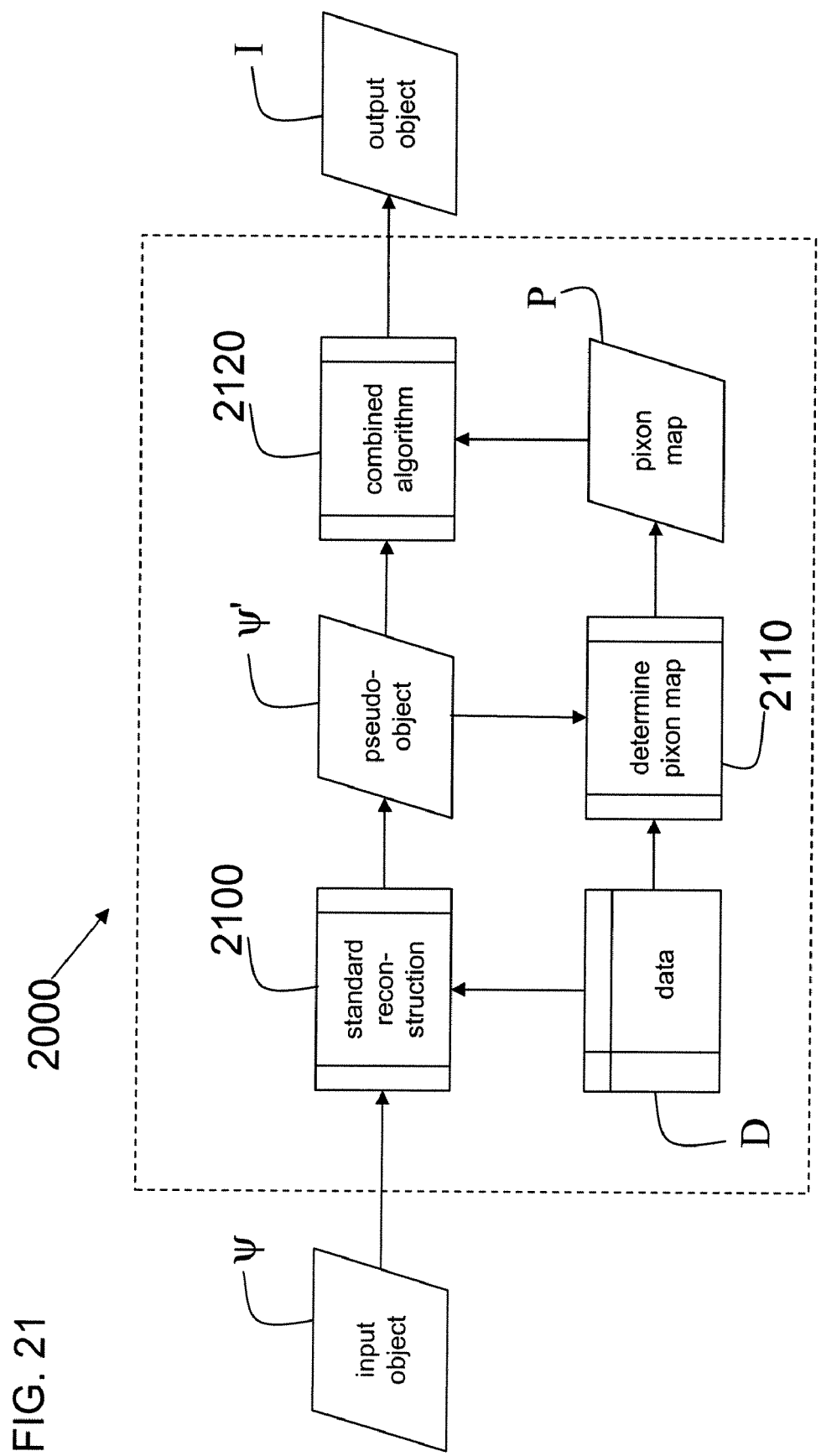
FIG. 21 is a flowchart illustrating a combined pixon smoothing and reconstruction algorithm applied after image reconstruction.

FIG. 21 illustrates an example series of the modular reconstruction system of FIG. 20. Using a standard reconstruction algorithm, an input object ψ is fitted to the imaging data D (step 2100). In accordance with the above discussed use of the pixon kernel operator K and as the pixon smoothing has not yet taken place, the resulting estimate of the (3D) object is called a pseudo-object ψ'. One then determines a pixon map P using the pseudo-object ψ' and the data set D (step 2110). The pseudo-object ψ' is also the initial object for the combined pixon smoothing and reconstruction operation (step 2120). During the combined pixon smoothing and reconstruction operation (step 2120), one reconstructs and pixon smoothes using the pixon kernel functions assigned by the pixon map P until a required quality of the (3D) image object I is reached.

Another example series can include a first pixon map construction, followed by a first set of pixon smoothing operations, an iterative image reconstruction with a predefined number of iterations, a second pixon map construction (or update of the first pixon map), followed by a combined pixon smoothing and reconstruction update operation. An initial reconstruction can be used to provide an initial pseudo-object to the first pixon smoothing operation.

Mathematical Description

The combined pixon smoothing and reconstruction uses a pixon smoothing operation that is inserted into a reconstruction algorithm, preferably with minimal intrusion. The essence of pixon smoothing is to insert additional, adaptive smoothing into the reconstructed image (object).

In object space, the image can be written as $$I = K \otimes \psi,$$

where K is the adaptive smoothing kernel and ψ>0 is a non-negative pseudo object.

The reconstruction is an inversion of the noisy projection into data space:

$$D = H \otimes I + N,$$

where H is the system matrix and N is the (usually Poisson) noise.

Combining the two equations results in $$D = H \otimes K \otimes \psi + N = W \otimes \psi + N,$$

with the effective system matrix W being defined by $H \otimes K$.

With the recognition that the effective system matrix W can be used to reconstruct the pseudo image ψ using the same procedure as that used to reconstruct the image I with the system matrix H, a programmatic intrusion can be minimized when the K and H operations are performed sequentially. Thus, in the forward projection, one performs the operation $W = H \otimes K$, and in the backward projection, one performs the operation $W^T = K^T \otimes H^T$.

The application of the additional K and $K^T$ operations can then be effected in separate subroutines, one for the forward projection and one for the backward projection, each comprising the pixon smoothing operation and a projection transformation between object space and data space. Thus, within a combined pixon smoothing and reconstruction algorithm, pixon smoothing can be applied together with one or more projection transformation just as easily as it can be applied to an object of the algorithm that is defined in object space. The combined pixon smoothing and reconstruction algorithm can thus be considered to be a pixon-constrained image reconstruction algorithm.

A standard reconstruction algorithm and a pixon map determination algorithm may precede the combined pixon smoothing and reconstruction algorithm to provide an initial object and an (initial) pixon map. Thus, in a first stage, an initial solution is found using some reconstruction method, e.g., ordered-set-expectation minimization (OSEM) or non-negative least squares (NNLS) algorithms, which do not contain any Pixon constraints. For example, the K operation can be set to be an identity operation.

In a second stage, the initial solution found in the first stage is used to determine the adaptive K operation from a pixon map calculation. The pixon map calculation can be based on a standard map determination or on a determination, which is specifically adapted to the statistics of the data set. The pixon map calculation itself involves the (unconditioned) forward and backward projections H and $H^T$.

The final 3D image object I is then determined in a third stage, in which the non-trivial K operation is added as an additional constraint to form a combined pixon smoothing and reconstruction algorithm.

Thus, the pixon method can be integrated into a conventional reconstruction algorithm by adding only three insertion points: (i) a K operation optionally added to a forward projection, (ii) a $K^T$ operation optionally added to a backward projection, and (iii) a pixon map determination using the H, $H^T$, K, and $K^T$ operations. This procedure is completely general and can be applied to any preexisting reconstruction method. All the specifics of the system matrix and the reconstruction method are already embodied in the H and $H^T$ operations and their use in the preexisting reconstruction method.

A number of embodiments have been described. Nevertheless, it will be understood that various modifications may be made without departing from the spirit of the invention. For example, Pixon smoothing can be incorporated into data reconstruction algorithms in different technological fields, such as astronomy, communication technology and medical imaging for 3D (image) reconstruction. Thus, a pixon map construction and the pixon smoothing operation can be based on data sets measured in these technology fields.

The order in which the different pixon kernel functions are used during the smoothing operation can be varied, the step size can be varied, or some pixon kernel functions may be considered only in defined areas of the image.

The table F of pixon kernel functions may comprise, for example, in the order of ten spherical pixon kernel functions. If one does not want to impose symmetry, one may use additionally or alternatively elliptical pixon kernel functions. However, asymmetric pixon kernel functions may increase the computational effort, which one can handle, for example, by using specifically designed hardware.

The pixon map P can be provided, for example, as a field of variables defining the pixon kernel functions or as a field of indices, which indicate kernel functions within the table F of the pixon kernel functions.

Various combinations of the combined smoothing and reconstruction described referring to FIGS. 2 to 21 can be employed. Additionally, one may apply one or more operations between the smoothing operation and the projection if it seems appropriate. For example, one can store the unsmoothed object for a later evaluation. Moreover, one can use more than one type of smoothing operation to constrain the reconstruction.

The pixon smoothing operation may be the calculation of an average of the values of the object points within the volume defined by the corresponding pixon kernel function. The pixon smoothing within the reconstruction can be applied multiple times until the quality of a corresponding data model fulfills a stop-criterion characterizing the goodness-of-fit of a current data model.

The updated objects, which provided as 3D image object may be the most recently updated object. Alternatively, it may be determined based on quality evaluation criteria. Instead of being supplied to a renderer for visualization, the output object can be supplied to a record keeping system (e.g., PACS system) or a system for automatic quantitative diagnosing.

The source of the radiation may be an object or patient positioned within the detecting area of the nuclear imaging system.

It is to be further understood that, because some of the constituent system components and method steps depicted in the accompanying figures can be implemented in software, the actual connections between the systems components (or the process steps) may differ depending upon the manner in which the disclosed method is programmed. Given the teachings provided herein, one of ordinary skill in the related art will be able to contemplate these and similar implementations or configurations of the disclosed system and method.

For example, the numerical and symbolic steps described herein can be converted into a digital program executed, e.g., on a digital signal processor according to methods well known in the art. The digital program can be stored on a computer readable medium such as a hard disk and can be executable by a computer processor. Alternatively, the appropriate steps can be converted into a digital program that is hardwired into dedicated electronic circuits within the compressor that executes the steps. Methods for generating such dedicated electronic circuits based on a given numerical or symbolic analysis procedure are also well known in the art.

Accordingly, other embodiments are within the scope of the following claims.

What is claimed is:

1. A tomographic reconstruction method for reconstructing a 3D image object corresponding to a data set, the method comprising:
   providing a pixon map;
   for each iteration step in a series of iteration steps of iterative reconstruction, determining, by a processor, an updated object by performing a combined operation including:
   performing an update operation for updating an input object, and
   performing a pixon smoothing operation for smoothing based on the pixon map; and
   following a last iteration, outputting, by the processor, one of the updated objects as the 3D image object.

2. The method of claim 1, wherein performing the pixon smoothing operation of the combined operation creates a pixon smoothed object, which is updated by the update operation.

3. The method of claim 1, wherein performing the update operation of the combined operation creates an unsmoothed updated object, which is pixon smoothed by the pixon smoothing operation.

4. The method of claim 1, wherein the combined operation further includes:
   performing a first projection operation from a data space to an object space, thereby creating a projected object, and wherein the pixon smoothing operation smoothes the projected object.

5. The method of claim 1, wherein the pixon smoothing operation creates a pixon smoothed object and wherein the combined operation further includes, following performance of the pixon smoothing operation, performing a projection operation of the pixon smoothed object from the object space to the data space.

6. The method of claim 1, wherein the update operation includes performing the pixon smoothing operation.

7. The method of claim 1, wherein performing the update operation includes:
   performing a calculation based on a parameter object, and wherein the pixon smoothing operation is integrated into the update operation to smooth the parameter object.

8. The method of claim 7, wherein
   the parameter object is a parameter object of a non-negative least square fit algorithm.

9. The method of claim 1, further including:
   determining the pixon map.

10. The method of claim 1, further including:
determining the pixon map based on the data set and an initial object.

11. The method of claim 10, wherein each iteration step further includes:
updating the pixon map based on the data set and the updated object of the preceding update operation.

12. The method of claim 10, wherein each iteration step further includes:
evaluating whether the update of the pixon map is necessary; and
updating the pixon map based on the result of the evaluation, the data set, and an updated object.

13. The method of claim 1, wherein each iteration step further includes:
updating a parameter of the update operation.

14. The method of claim 1, wherein each iteration step further includes:
executing a loop over subsets of the data set, wherein executing the loop includes performing the update operation.

15. The method of claim 14, wherein executing the loop further includes:
performing the pixon smoothing operation.

16. The method of claim 14, wherein executing the loop further includes:
updating the pixon map.

17. The method of claim 16, wherein executing the loop further includes:
evaluating whether an update of the pixon map is necessary; and
updating the pixon map based on the result of the evaluation, the data set and an updated object of the image object.

18. The method of claim 16, wherein executing the loop further includes:
updating a parameter of the update operation.

19. In a non-transitory computer readable medium having included software thereon, the software including instructions executable by a processor to tomographically reconstruct a 3D image object corresponding to a data set, the instructions comprising:
for each iteration step in a series of iteration steps for iterative reconstruction, determining an updated object by performing a combined operation including:
performing an update operation for updating an input object, and
performing a pixon smoothing operation; and
following a last iteration, outputting one of the updated objects as the 3D image object.

20. A nuclear imaging device for providing a 3D medical image, the device comprising:
a detector unit for detecting radiation emitted from within a detecting area and providing a data set indicative of the detected radiation;
an iterative reconstruction unit configured to perform, in each iteration step, a combined operation that includes an update operation for updating an input object and a pixon smoothing operation for smoothing based on a pixon map; and
an output port for providing the 3D medical image.

21. The nuclear imaging device of claim 20, wherein the update operation is an update operation of a reconstruction algorithm selected from the group consisting of algorithms based on maximum likelihood, algorithms based on a penalty function, algorithms based on an ordered subset expectation maximization, algorithms based on a non-negative least square fit, and algorithms based on an ordered subset non-negative least square fit.

22. The nuclear imaging device of claim 20, wherein the reconstruction unit is configured to update the pixon map used within the pixon smoothing operation based on an updated image object.

23. The nuclear imaging device of claim 20, wherein the detector unit includes a detector system selected from the group consisting of a positron emission tomography detector system, a single photon computed tomography detector system and a computed tomography detector system.

\* \* \* \* \*